US011615358B2

(12) United States Patent
Tabak et al.

(10) Patent No.: US 11,615,358 B2
(45) Date of Patent: Mar. 28, 2023

(54) DATA INSIGHTS FOR PERFORMANCE ANALYTICS

(71) Applicant: ServiceNow, Inc., Santa Clara, CA (US)

(72) Inventors: Aida Rikovic Tabak, Amsterdam (NL); Shayan Shahand, Amsterdam (NL); Dileeshvar Radhakrishnan, San Jose, CA (US); Seth Tucker Stafford, San Jose, CA (US); Sumana Ravikrishnan, Sunnyvale, CA (US); Abhijith Thette Nagarajan, Amstelveen (NL); Robert Andrew Ninness, Amsterdam (NL); Prabhakaran Subramani Thandayuthapani, Amsterdam (NL); Marta Penzo, Amsterdam (NL)

(73) Assignee: ServiceNow, Inc., Santa Clara, CA (US)

(*) Notice: Subject to any disclaimer, the term of this patent is extended or adjusted under 35 U.S.C. 154(b) by 215 days.

(21) Appl. No.: 17/074,115

(22) Filed: Oct. 19, 2020

(65) Prior Publication Data

US 2021/0089977 A1 Mar. 25, 2021

Related U.S. Application Data

(63) Continuation-in-part of application No. 15/905,696, filed on Feb. 26, 2018, now Pat. No. 10,812,335.
(Continued)

(51) Int. Cl.
*G06Q 10/06* (2012.01)
*G06F 3/04817* (2022.01)
(Continued)

(52) U.S. Cl.
CPC ....... *G06Q 10/0633* (2013.01); *G06F 3/0482* (2013.01); *G06F 3/04817* (2013.01); *G06F 9/452* (2018.02); *G06Q 10/06393* (2013.01)

(58) Field of Classification Search
None
See application file for complete search history.

(56) References Cited

U.S. PATENT DOCUMENTS 5,978,594 A 11/1999 Bonnell
6,321,229 B1 11/2001 Goldman
(Continued)

FOREIGN PATENT DOCUMENTS

WO WO2005020001 A2 3/2005

OTHER PUBLICATIONS ttps://www.servicenow.com/products/performance-analytics.html Feb. 18, 2018.

*Primary Examiner* — Angela Nguyen
(74) *Attorney, Agent, or Firm* — Fletcher Yoder PC

(57) ABSTRACT

An enterprise management platform is configured to host a respective instance for multiple client networks. The enterprise management platform receives incoming data including one or more metrics being tracked in the incoming data by the enterprise management platform. The enterprise management platform determines that a condition is reached based on the one or more metrics and selects at least a portion of the incoming data for a dashboard of the enterprise management platform responsive to determining that the incoming data is indicative of the condition being reached. The enterprise management platform provides, to a client device associated with one of the plurality of client networks, a representation of a graphical user interface displaying a data insights widget of the dashboard that displays the data indicative of the condition being reached (Continued)

without displaying other data in the incoming data that has not reached a level indicative of other conditions.

20 Claims, 21 Drawing Sheets

Related U.S. Application Data

(60) Provisional application No. 62/568,087, filed on Oct. 4, 2017.

(51) Int. Cl.
*G06Q 10/0633* (2023.01)
*G06F 3/0482* (2013.01)
*G06F 9/451* (2018.01)
*G06Q 10/0639* (2023.01)

(56) References Cited

U.S. PATENT DOCUMENTS

| | | | |
|---|---|---|---|
| 6,799,189 B2 | 9/2004 | Huxoll | |
| 6,816,898 B1 | 11/2004 | Scarpelli | |
| 6,895,586 B1 | 5/2005 | Brasher | |
| 6,916,909 B1 | 7/2005 | Nicolas et al. | |
| 7,020,706 B2 | 3/2006 | Cates | |
| 7,027,411 B1 | 4/2006 | Pulsipher | |
| 7,392,300 B2 | 6/2008 | Anantharangachar | |
| 7,617,073 B2 | 11/2009 | Trinon | |
| 7,685,167 B2 | 3/2010 | Mueller | |
| 7,716,353 B2 | 5/2010 | Golovinsky | |
| 7,769,718 B2 | 8/2010 | Murley | |
| 7,877,783 B1 | 1/2011 | Cline | |
| 7,925,981 B2 | 4/2011 | Pourheidari | |
| 7,933,927 B2 | 4/2011 | Dee | |
| 7,941,506 B2 | 5/2011 | Bonal | |
| 7,945,860 B2 | 5/2011 | Vambenepe | |
| 8,082,222 B2 | 12/2011 | Rangarajan | |
| 8,151,261 B2 | 4/2012 | Sirota | |
| 8,346,752 B2 | 1/2013 | Sirota | |
| 8,380,645 B2 | 2/2013 | Kowalski | |
| 8,402,127 B2 | 3/2013 | Solin | |
| 8,468,502 B2 | 6/2013 | Lui et al. | |
| 8,612,408 B2 | 12/2013 | Trinon | |
| 8,646,093 B2 | 2/2014 | Myers | |
| 8,683,032 B2 | 3/2014 | Spinelli | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 8,907,988 B2 | 12/2014 | Poston | |
| 9,015,188 B2 | 4/2015 | Behne | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,261,372 B2 | 2/2016 | Cline | |
| 9,317,327 B2 | 4/2016 | Apte | |
| 9,323,801 B2 | 4/2016 | Morozov | |
| 9,363,252 B2 | 6/2016 | Mueller | |
| 9,412,084 B2 | 9/2016 | Kowalski | |
| 9,467,344 B2 | 10/2016 | Gere | |
| 9,534,903 B2 | 1/2017 | Cline | |
| 9,535,737 B2 | 1/2017 | Joy | |
| 9,596,146 B2 | 3/2017 | Coates et al. | |
| 9,613,070 B2 | 4/2017 | Kumar | |
| 9,631,934 B2 | 4/2017 | Cline | |
| 9,645,833 B2 | 5/2017 | Mueller | |
| 9,654,833 B2 | 5/2017 | Mueller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,819,729 B2 | 11/2017 | Moon | |
| 9,852,165 B2 | 12/2017 | Morozov | |
| 9,967,162 B2 | 5/2018 | Spinelli | |
| 10,002,203 B2 | 6/2018 | George | |
| 2005/0038818 A1 | 2/2005 | Hooks | |
| 2009/0281845 A1 | 11/2009 | Fukuda et al. | |
| 2013/0024431 A1 | 1/2013 | Parthasarathy et al. | |
| 2015/0207813 A1 | 7/2015 | Reybok et al. | |
| 2016/0104076 A1 | 4/2016 | Maheshwari et al. | |

DATA INSIGHTS FOR PERFORMANCE ANALYTICS

CROSS-REFERENCE TO RELATED APPLICATIONS

This application is a continuation application of U.S. Pat. No. 10,812,335, filed Feb. 26, 2018, entitled "DATA INSIGHTS FOR PERFORMANCE ANALYTICS", which claims the benefit of Provisional Application Ser. No. 62/568,087, filed Oct. 4, 2017, entitled "PLATFORM COMPUTING ENVIRONMENT AND FUNCTIONALITY THEREOF," which is incorporated by reference herein in its entirety.

BACKGROUND

This section is intended to introduce the reader to various aspects of art that may be related to aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources hosted in distributed computing (e.g., cloud-computing) environments may be disparately located with different resources potentially having their own functions, properties, and/or permissions. Such resources may include hardware resources (e.g. computing devices, switches, etc.) and software resources (e.g. database applications). These resources may be used to collect and store data at various times related to a variety of measurable properties, including network, hardware, or database performance properties measured at different times. As systems for collecting data become more readily available and the costs for storage hardware continue to decrease, the amount of data that these computer resources are capable of collecting is increasing. For instance, in addition to collecting raw data more frequently, metadata associated with the time in which the raw data has been generated or acquired may also be stored for a given data set.

Although the capabilities of computer resources for collecting and storing data continue to expand, the vast amount of collected data has resulted in difficulties with analysis and reporting of the ever-increasing multitude of data.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, and store information. As increasing amounts of data representing resources become available, it becomes increasingly difficult to analyze the data, interact with the data, and/or provide reports for the data. The current embodiments enable customized analysis of such data and identifies and provides insights about the potentially massive amount of data without presenting items that are less notable. As discussed, herein this data may be sorted according to notability or "newsworthiness." The notability of various metrics or indicators may include raw numbers (e.g., number of open incidents), generated from raw number using transfer functions, weighted manually by users, or any combination thereof. Furthermore, in some embodiments, the insights may include predictive forecasting based on the data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein makes reference to the accompanying drawings, wherein like reference numerals refer to like parts throughout the several views.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The following discussion relates to analysis, forecasting, and reporting systems for Information Technology (IT) systems. However, this is not meant to limit the current techniques to IT systems. Indeed, the current techniques may be useful in a number of different contexts. For example the current techniques may be applied to Human Resources (HR) systems or any system that may benefit from the analysis, forecasting, and reporting of data.

Keeping this in mind, the discussion now turns to an Information Technology (IT)-centered example. IT devices are increasingly important in a world in which various electronics devices are interconnected within a distributed context. As more functions are performed by services using some form of distributed computing, the complexity of IT network management increases. As management complexities increase, data analysis, forecasting, and reporting may become more complex.

Figure 1:
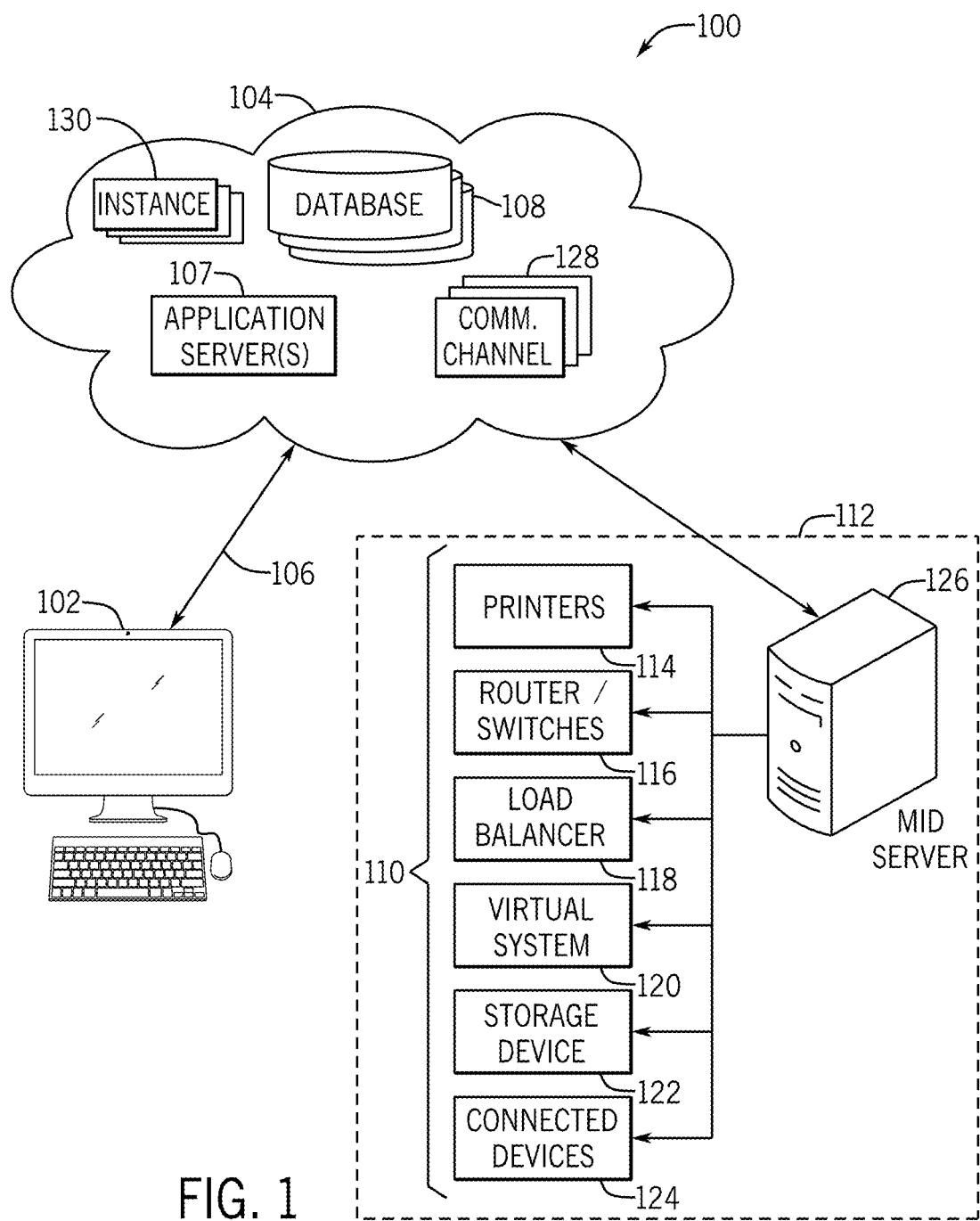
FIG. 1 is a block diagram of a distributed computing system, in accordance with an embodiment.

By way of introduction to the present concepts and to provide context for the examples discussed herein, FIG. 1 is a block diagram of a system 100 that utilizes a distributed computing framework, which may perform one or more of the techniques described herein. As discussed below in relation to FIG. 2, the system 100 may include or support a multiple-instance architecture. As illustrated in FIG. 1, a client 102 communicates with a platform 104, such as a cloud service platform, over a communication channel 106. The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously.

The platform 104 may include any suitable number of computing devices (e.g., computers) in one or more locations that are connected together using one or more networks. For instance, the platform 104 may include various computers acting as servers in datacenters at one or more geographic locations where the computers communicate using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include inter-network connections when the client and the platform 104 are on different networks or entirely using intra-network connections when the client 102 and the platform 104 share a common network. Although only a single client 102 is shown connected to the platform 104, it should be noted that platform 104 may connect to multiple clients (e.g., tens, hundreds, or thousands of clients).

Through the platform 104, here a cloud service type-platform, the client 102 may connect to various devices with various functionality, such as gateways, routers, load balancers, databases, application servers running application programs on one or more nodes, or other devices that may be accessed via the platform 104. For example, the client 102 may connect to an application server 107 and/or one or more databases 108 via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client 102 via the platform 104. The application nodes may be implemented using processing threads, virtual machine instantiations, or other computing features of the application server 107. Moreover, the application nodes may store, evaluate, or retrieve data from the databases 108 and/or a database server.

In some embodiments, the databases 108 may contain a series of tables containing information about assets and enterprise services controlled by the client 102 and the configurations of these assets and services. The assets and services include configuration items (CIs) 110 that may be computers, other devices on a network 112 (or group of networks), software contracts and/or licenses, or enterprise services. In some embodiments, the client 102 may be associated with and/or located within the network 112. The CIs 110 may include hardware resources (such as server computing devices, client computing devices, processors, memory, storage devices, networking devices, or power supplies); software resources (such as instructions executable by the hardware resources including application software or firmware); virtual resources (such as virtual machines or virtual storage devices); and/or storage constructs (such as data files, data directories, or storage models). As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally or alternatively, the connected devices 124 may include facility-controlling devices having aspects that are accessible via network communication, such as heating, ventilation, and air conditioning (HVAC) units, fuel tanks, power equipment, and the like. The databases 108 may include information related to CIs 110, attributes (e.g., roles, characteristics of elements, etc.) associated with the CIs 110, and/or relationships between the CIs 110.

In some embodiments, the databases 108 may include a configuration management database (CMDB) that may store the data concerning CIs 110 mentioned above along with data related to various IT assets that may be present within the network 112. In addition to the databases 108, the platform 104 may include one or more other database servers. The database servers are configured to store, manage, or otherwise provide data for delivering services to the client 102 over the communication channel 106. The database server may include one or more additional databases that are accessible by the application server 107, the client 102, and/or other devices external to the additional databases. By way of example, the additional databases may include a relational database and/or a time series database. The additional databases may be implemented and/or managed using any suitable implementations, such as a relational database management system (RDBMS), a time series database management system, an object database, an extensible markup language (XML) database, a configuration management database (CMDB), a management information base (MIB), one or more flat files, and/or or other suitable non-transient storage structures. In some embodiments, more than a single database server may be utilized. Furthermore, in some embodiments, the platform 104 may have access to one or more databases external to the platform 104 entirely.

In the depicted topology, access to the CIs 110 from the platform 104 is enabled via a management, instrumentation, and discovery (MID) server 126 via a communication queue 128, such as an External Communications Channel Queue. However, in some embodiments, at least a portion of the CIs 110 may directly couple to the platform 104. The MID server 126 may include an application program (e.g., Java application) that runs as a service (e.g., Windows service or UNIX daemon) that facilitates communication and movement of data between the platform 104 and external applications, data sources, and/or services. The MID server 126 may be implemented using a computing device (e.g., server or computer) on the network 112 that communicates with the platform 104. The MID server 126 may periodically or intermittently use discovery probes to determine information on devices connected to the network 112 and return the probe results back to the platform 104. In the illustrated embodiment, the MID server 126 is located inside the network 112 thereby alleviating the use of a firewall in communication between the CIs 110 and the MID server 126. However, in some embodiments, a secure tunnel may be generated between a MID server 126 running in the platform 104 that communicates with a border gateway device of the network 112.

The communication channel 128 may be a database table that is typically queried, updated, and inserted into by other systems. Each record in the communication channel 128 is a message from an instance in the platform 104 to a system (e.g., MID server 126) external to the platform 104 that connects to the platform 104 or a specific instance 130 running in the platform 104 or a message to the instance from the external system. The fields of a communication channel 128 record include various data about the external system or the message in the record.

Although the system 100 is described as having the application servers 107, the databases 108, the communication channel 128, the MID server 126, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems (or computer systems in general) may communicate with the platform 104 in addition to the MID server 126 and/or may be used to implement the present approach.

Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the platform 104.

In addition, other methods for populating the databases 108 may include directly importing the CIs or other entries from an external source, manual import by users entering CIs or other entries via a user interface, and the like. Moreover, although the details discussed above are provided with reference to the CMDB, it should be understood that the embodiments described herein should not be limited to being performed with the CMDB. Instead, the present systems and techniques described herein may be implemented with any suitable database.

In any case, the application servers 107 and/or the databases 108 may store content accessible by one or more users via one or more of the clients 102. For example, the application server 107 may store one or more pages with which one or more of the users may interact (e.g., view, post, etc.) with other users and/or customer service agents. As a result, users may use the pages to track and/or resolve issues that arise through installation, expansion, maintenance, and regular use of the network, either on their own, or with the help of a customer service agent. Furthermore, the pages may be used to display key performance indicators of functions (e.g., ticket resolution for open items for the customer service agent) implemented using the application programs of the application servers 107.

Figure 2:
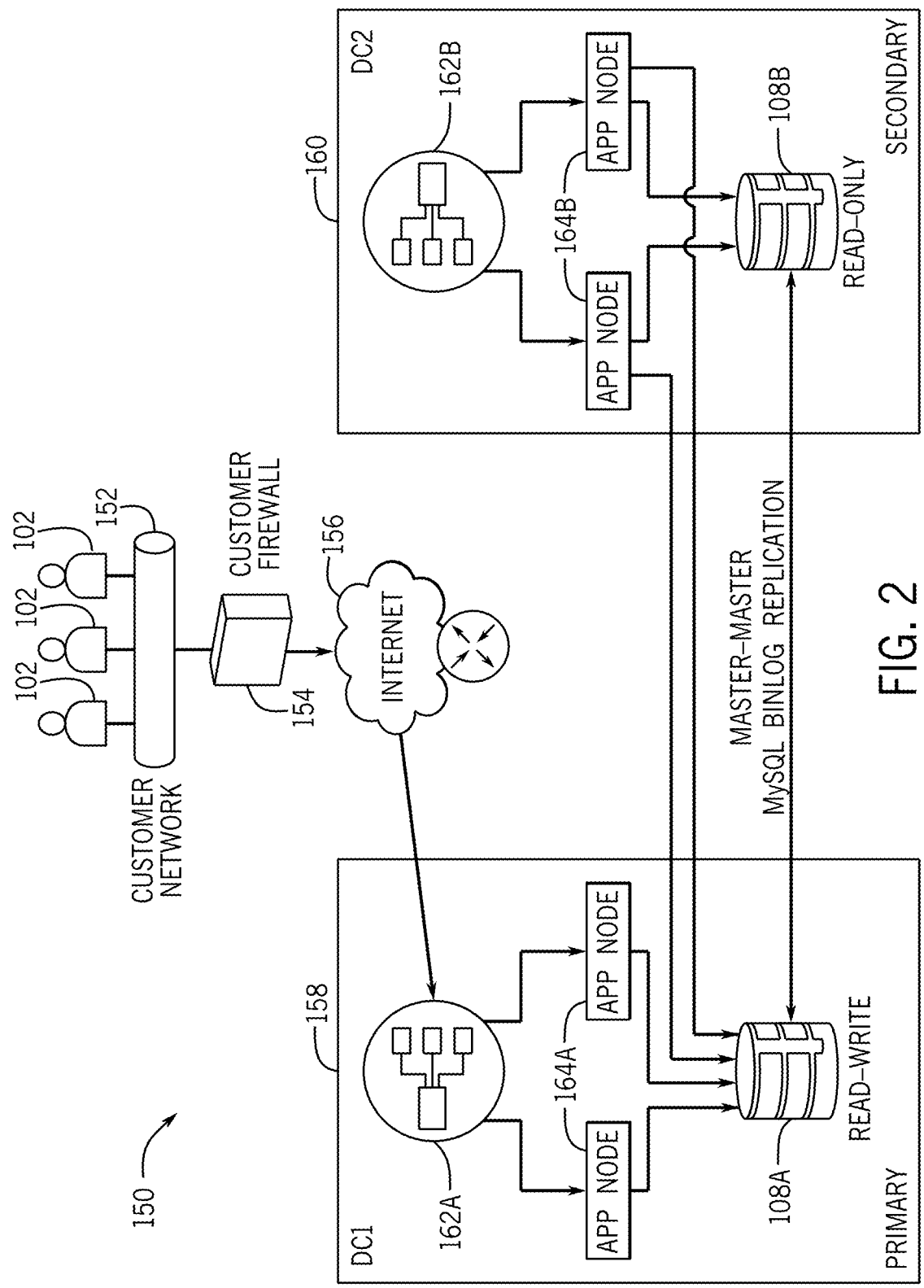
FIG. 2 is a schematic of an embodiment of a multi-instance architecture 150 that may be utilized by the distributed computing system of FIG. 1, in accordance with an embodiment.

FIG. 2 is a schematic of an embodiment of a multi-instance architecture 150 that may be utilized by the system 100 of FIG. 1. As shown, the one or more clients 102 are connected to a customer network 152, which may or may not be protected by a firewall 154. The one or more clients 102 may access first and second virtual machines 158, 160 via the Internet 156. In the illustrated embodiment, the first virtual machine 158 is a primary virtual machine 158 and the second virtual machine 160 is a secondary virtual machine. The primary and secondary virtual machines 158, 160 are disposed in different data centers. Other embodiments may include more than two virtual machines (e.g., multiple secondary virtual machines). As shown, each of the virtual machines 158, 160 includes at least one load balancer 162, multiple application nodes 164, and a database 108. In the illustrated embodiment, the database 108A of the primary virtual machine 158 is a read-write database, and the database 108B of the secondary virtual machine 160 is a read-only database. The databases 108 may be replicated via MySQL binlog replication for near-real-time replication between the primary database 108A and the secondary database 108B. As shown, the application nodes 164A of the primary virtual machine 158 may access the primary database 108A, while the applications nodes 164B of the secondary virtual machine 160 may access both the primary database 108A and the secondary database 108B.

Each customer may have its own dedicated virtual machines 158, 160 and database processes. Further, full and incremental backups may be scheduled as the customer wishes (e.g., daily, weekly, bi-weekly, monthly, etc.). The multi-instance architecture 150 results in full instance redundancy for all production instances with near-real-time replication and no comingling of data between customers. By providing customers with their own database(s) 108, customers are isolated from database maintenance and/or database failure of other customers. Further, maintenance and repair windows are shorter. In some embodiments, a client 102 may pull data from multiple different databases 108 distributed over multiple virtual machines 158, 160 and/or data centers. The pulled data may then be combined and used as inputs to perform a task, such as tracking key performance indicators for the various instances.

Figure 3:
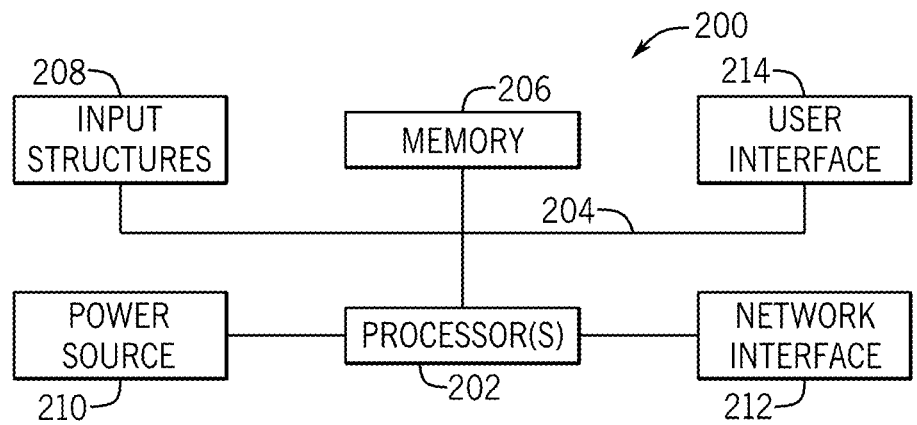
FIG. 3 is a block diagram of a computing device utilized in the distributed computing system of FIG. 1, in accordance with an embodiment.

In any case, to perform one or more of the operations described herein, the client 102, the application server 107, the MID server 126, and other servers or computing systems described herein may include one or more of the computer components depicted in FIG. 3. FIG. 3 generally illustrates a block diagram of example components of a computing device 200 and their potential interconnections or communication paths, such as along one or more busses. As briefly mentioned above, the computing device 200 may be an embodiment of the client 102, the application server 107, a database server (e.g., databases 108), other servers or processor-based hardware devices present in the platform 104 (e.g., server hosting the communication channel 128), a device running the MID server 126, and/or any of the CIs. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include processors capable of performing instructions stored in the memory 206. For example, the one or more processors may include microprocessors, system on a chips (SoCs), or any other suitable circuitry for performing functions by executing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), Wi-Fi, infrared, and/or other suitable protocols.

A user interface 214 may include a display that is configured to display images transferred to it from the one or more processors 202. In addition and/or alternative to the display, the user interface 214 may include other devices for interfacing with a user. For example, the user interface 214 may include lights (e.g., LEDs), speakers, and the like.

Display Widgets

Figure 4:
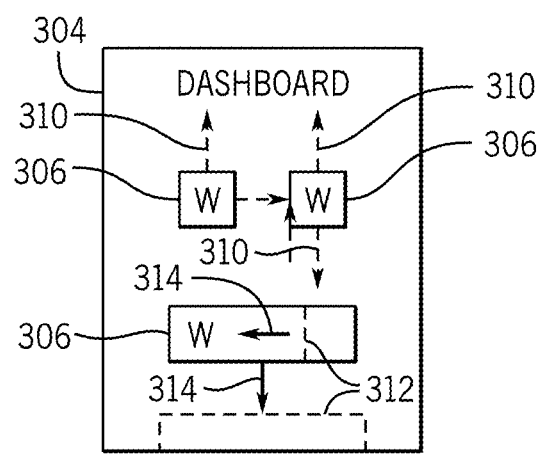
FIG. 4 is a block diagram illustrating performance analytics and reporting (PAR) features facilitated through a dashboard for the distributed computing system of FIG. 1, in accordance with an embodiment.

The discussion now turns to a mechanism for displaying system data, enabling interactivity with the system data, and reporting on the system data. As may be appreciated, such system data may be relevant to a system in a platform environment as described with respect to FIG. 1 as well as to system in a multi-instance architecture as described with respect to FIG. 2. FIG. 4 is a block diagram illustrating performance analytics and reporting (PAR) features facilitated through a dashboard 304, in accordance with an embodiment. As used herein, a "dashboard" refers to a graphical-user-interface (GUI) screen where data-driven widgets 306 and/or other widgets may be dynamically presented. The widgets 306 may include independent data-driven software that perform particular tasks. For example, the widgets 306 may provide visualizations generated from/ based upon datasets of the system. For instance, the widgets 306 may provide data insights that indicate headlines portraying "news" relevant to one or more indicator types of data being tracked. For example, the indicator types may include a number of open incidents, a number of resolved problems, percentage of incidents resolved by a specific assigned group, a percentage of new critical incidents relative to a total number of new incidents, a percentage of open incidents that have not been updated in a certain time period (e.g., days, weeks, or months), average age of last update of open incidents, average age of open incidents, average re-assignment of open incidents, average resolution time of resolved incidents, growth of an incident backlog, number of new incidents, number of open incidents, number of open incidents not updated in a certain time period (e.g., days, weeks, or months), number of resolved incidents, data reflecting statuses (e.g., online, offline, busy, idle, error modes) of the CIs 110, and/or any user-defined statistics that may be tracked in the PAR features on dashboard 304.

In some embodiments, the widgets 306 placed on the screen may be constrained to pre-defined containers with or without static locations and/or static sizes. In other words, in some embodiments, for dashboard 304, the widgets 306 may be dynamically moved to any location on the dashboard 304 without being constrained to pre-defined locations, as indicated by arrows 310. Further, the size of the widgets 306 may be dynamically altered in the dashboard 304, as indicated by the sizing indicators 312 and the arrows 314.

Figure 5:
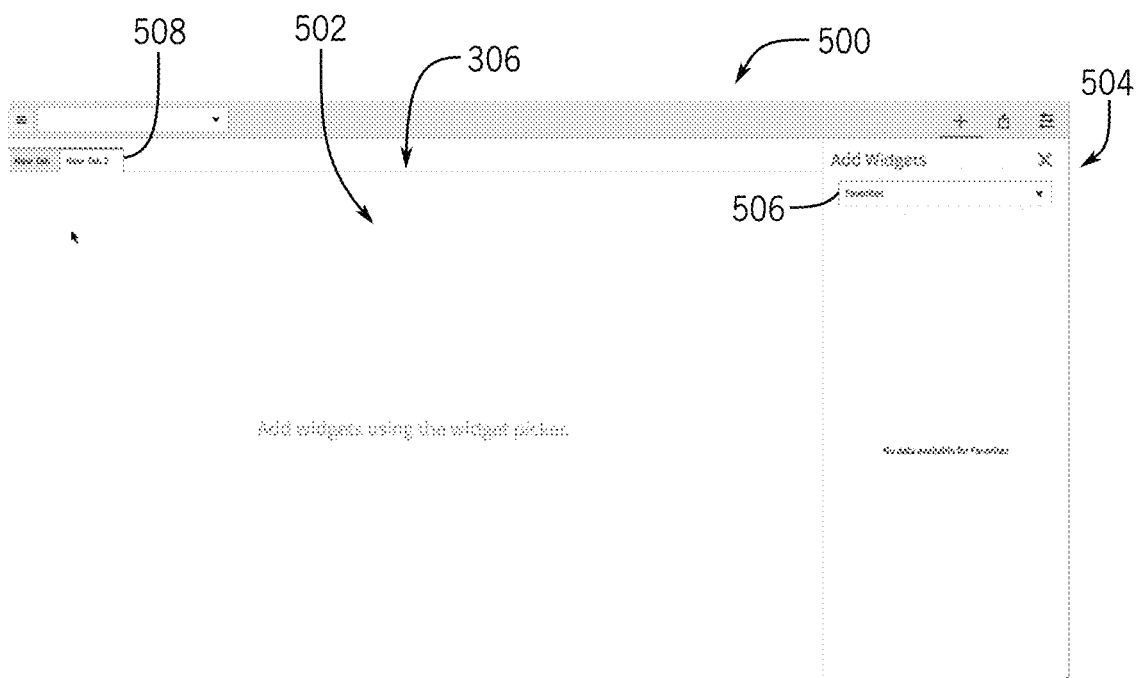
FIG. 5 is an illustration of a graphical user interface (GUI) 500 illustrating a blank canvas 502 where widgets may be placed in the dashboard of FIG. 4, in accordance with an embodiment.
Figure 6:
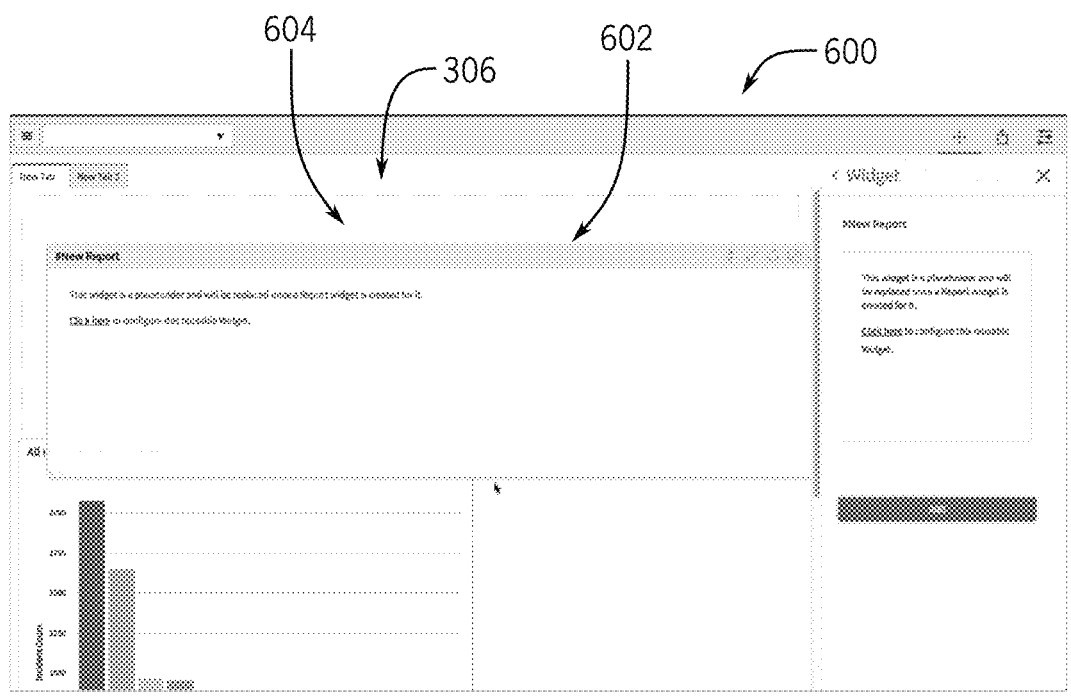
FIG. 6 is an illustration of a GUI with a "New Report" widget being dragged and dropped to the canvas of FIG. 5, in accordance with an embodiment.

As previously noted, the widgets 306 may include independent data-driven software that perform particular tasks, such as visualizations generated from datasets of the system. These widgets 306 may be selectable to be added to the dashboard 304. For example, in some embodiments, a dashboard 304 may allow widgets 306 to be dragged and dropped into any location within a canvas of a dashboard 304. Further, as previously noted, the widgets 306 may be dynamically sized and re-arranged. Turning to a discussion of the dynamic widget positioning and resizing, FIG. 5 is an illustration of a graphical user interface (GUI) 500 illustrating a blank canvas 502 where widgets 306 may be placed. In some embodiments, the widgets 306 may be added to the GUI 500 using an add widget sidebar 504. In such embodiments, a dropdown list 506 may provide a list of available widgets that may be added to the dashboard 304. In FIG. 5, the blank canvas 502 is formed on a tab 508. A dialog box (e.g., the Add Widget sidebar 504) may be provided, such that a widget 306 may be selected from the dropdown list 506 and placed in the canvas 502 (e.g., via drag and drop). For example, in FIG. 6, a GUI 600 illustrates a "New Report" widget 602 being dragged and dropped to a canvas 604.

Figure 7:
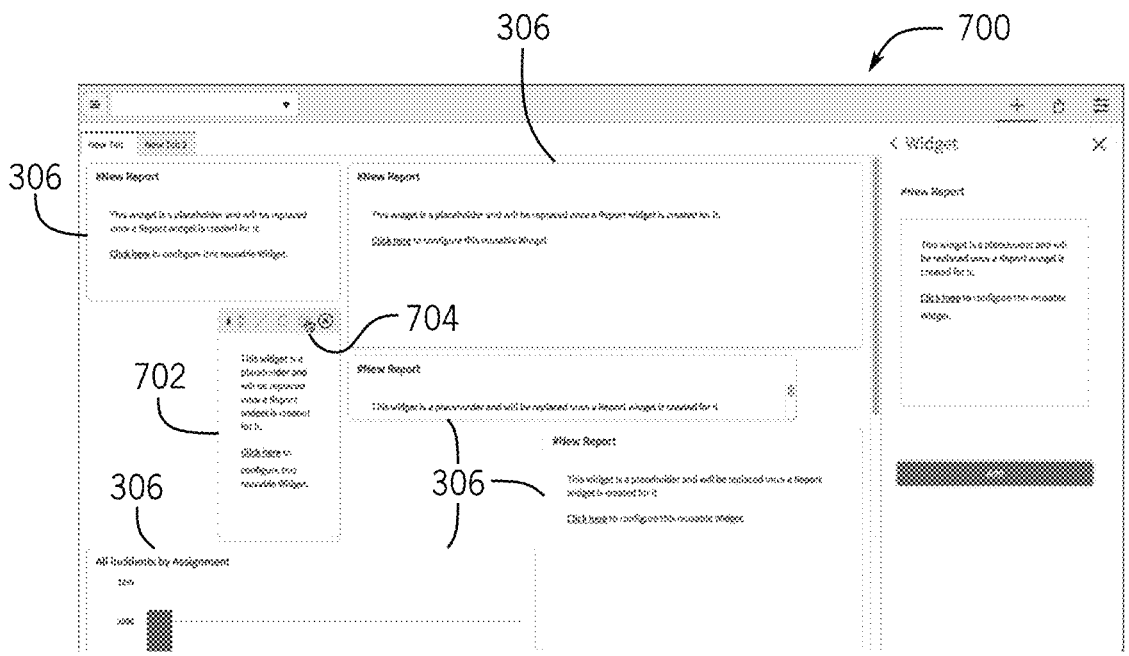
FIG. 7 is an illustration of a GUI presenting dynamically resized and positioned widgets in the dashboard of FIG. 4, in accordance with an embodiment.
Figure 8:
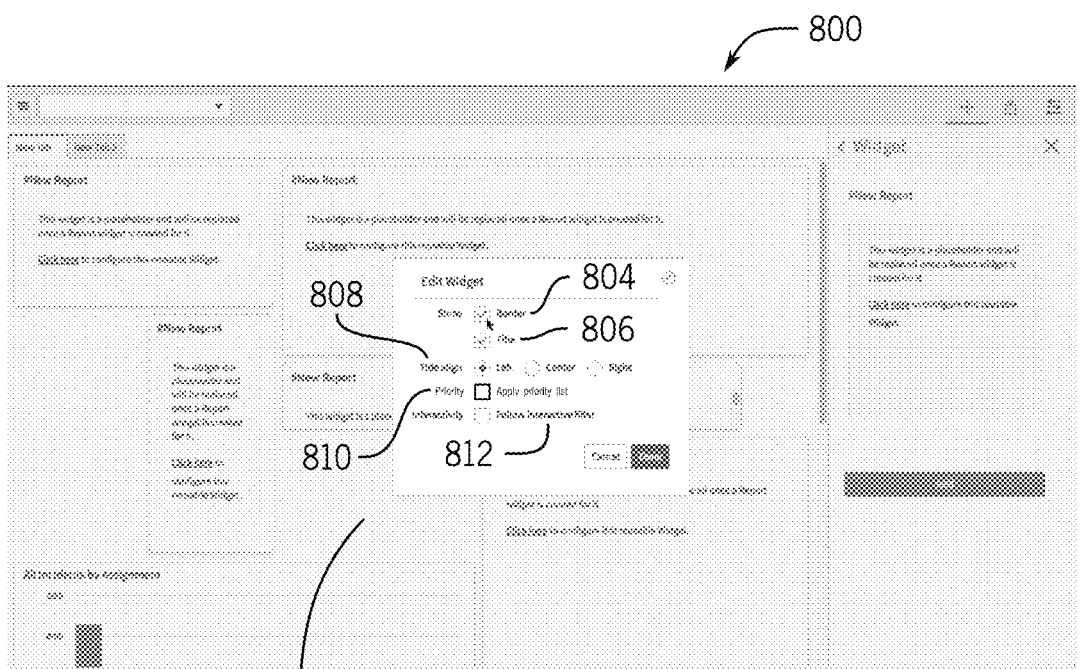
FIG. 8 is an illustration of a GUI where a characteristic editing dialog box is presented upon selection of the configuration option in the dashboard of FIG. 4, in accordance with an embodiment.

FIG. 7 illustrates a GUI 700 presenting dynamically resized and positioned widgets 306. In addition, in some embodiments, when a hover over occurs on one of the widgets 306, a dialog box 702 may appear. The dialog box 702 may include a configuration option 704, which may be used to edit characteristics of the widget 306. For example, FIG. 8 illustrates a GUI 800 where a characteristic editing dialog box 702 is presented upon selection of the configuration option 1406. The characteristic editing dialog box 802 may include a border option 804 to selectively turn a border for the widget 306 on or off. Further, a title option 806 may selectively turn a title presentation for the widget 306 on or off. A title align option 808 may selectively determine whether the title of the widget 306 is left justified, right justified, or centered. A priority option 810 may be used to select whether a priority list is applied for the widget 306. For example, the widget 306 may present key performance indicators, and the priority option 810 may be used to prioritize the indicators in the widget 306 for an organized display. An interactivity option 814 selectively enables an interactive filter, which may filter some of the data from the report visualized by the widget 306, as will be discussed in more detail below.

Performance Analytics Widget

Figure 9:
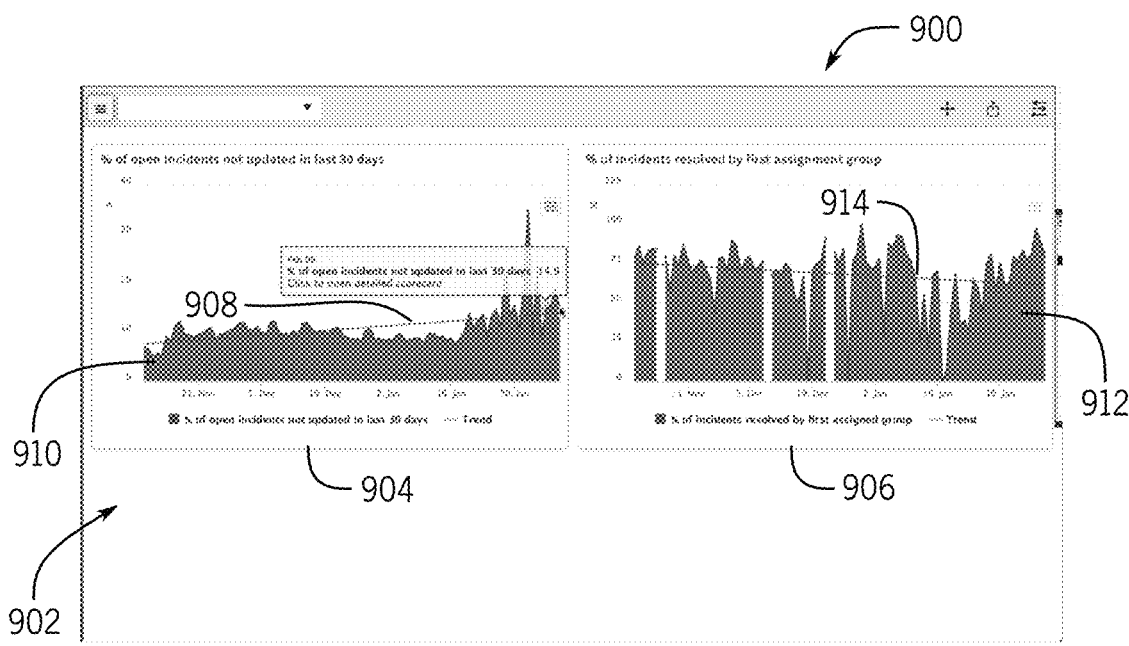
FIG. 9 is an illustration of a GUI of a performance analytics widget positioned on the dashboard of FIG. 4, in accordance with an embodiment.

As previously noted, the widget 306 may include a performance analytics widget. For example, FIG. 9 is an illustration of a GUI 900 of a performance analytics widget 902 positioned on the dashboard 304, in accordance with an embodiment. The performance analytics widget 902 provides a visualization of key performance indicators (KPIs) and metrics. In the currently illustrated embodiment, two data plots 904 and 906 are provided. Data plot 904 provides an indication of a percentage of open incidents (X-axis) over a period of time ranging from the last 30 days (Y-axis). Additionally, a trend 908 is defined and presented based upon the data 910 in the data plot 904. The data plot 906 includes data 912 indicating a percentage of incidents resolved by a first assignment group (X-axis) over a period of time (Y-axis). Further, a trend 914 is defined and presented based upon the data 912 in the data plot 906.

Figure 10:
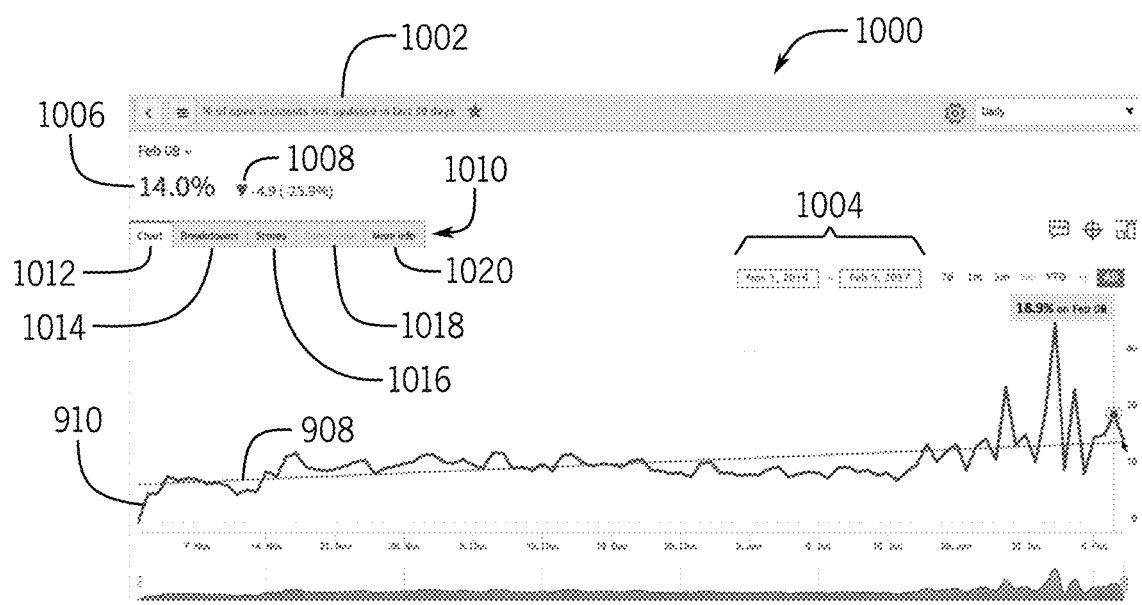
FIG. 10 is an illustration of a GUI that provides a deep-dive into the performance analytics widget of FIG. 9 based upon the selection of a data plot, in accordance with an embodiment.

When one of the plots 904 and/or 906 is selected, the GUI 900 may transition to a larger view of the data with additional options. FIG. 10 is an illustration of a GUI 1000 that provides a deep-dive into the performance analytics widget 902 of FIG. 9, based upon the selection of the data plot 904, in accordance with an embodiment. The title 1002 illustrates the title of the data plot 904 of FIG. 9. Further, a range selector 1004 enables selection of a new range for the data 910. The GUI 1000 also includes a change indicator 1006 that indicates the change (e.g., percentage change) corresponding to the indicator of the title 1002. Furthermore, a directional change indicator 1008 indicates a direction of change. Here, since a percentage of open incidents is a negative condition a positive change in the percentage is a negative condition. Accordingly, the directional change indicator 1008 includes a downward arrow indicating a negative change in condition even when the change in percentage of open incidents has increased. In other words, the directional change indicator 1008 enables a quick identification of whether the condition corresponding to the data plot 904 is improving or worsening. Furthermore, the directional change indicator 1008 and/or the change indicator 1006 may include a color indicating whether the condition is improving (e.g., green) or worsening (e.g., red).

The GUI 1000 may also include a navigation bar 1010 that includes a chart button 1012, a breakdown button 1014, a scores button 1016, a comments button 1018, and more info button 1020. The chart button 1012 may be selected to cause a chart of the data 910 to be displayed in the GUI 1000. The breakdown button 1014 may be used to view various breakdowns of the data 910. The scores button 1016 may be used to view raw numbers of the measurement corresponding to the indicator type. The comments button 1018 may be used to view/edit/change comments related to the indicator type. The more info button 1020 may be used to view additional information about the indicator type and/or the data 910.

Figure 11:
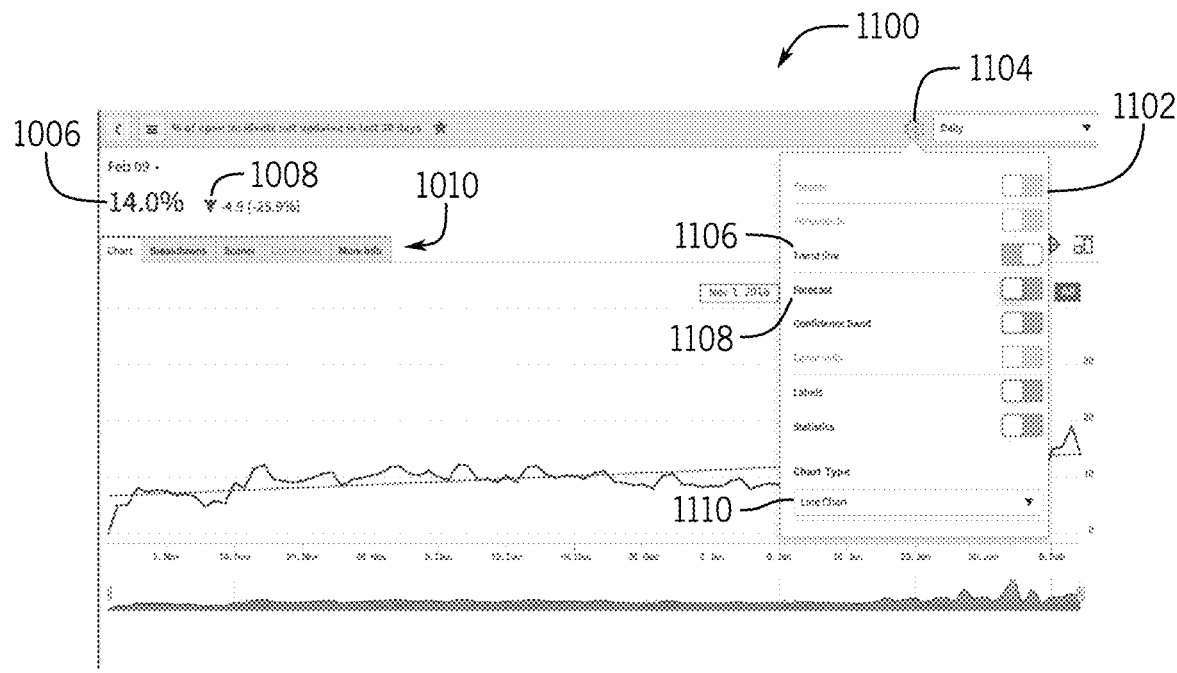
FIG. 11 is an illustration of a GUI that provides a configuration menu, triggered by a configuration icon in the dashboard of FIG. 4, in accordance with an embodiment.
Figure 12:
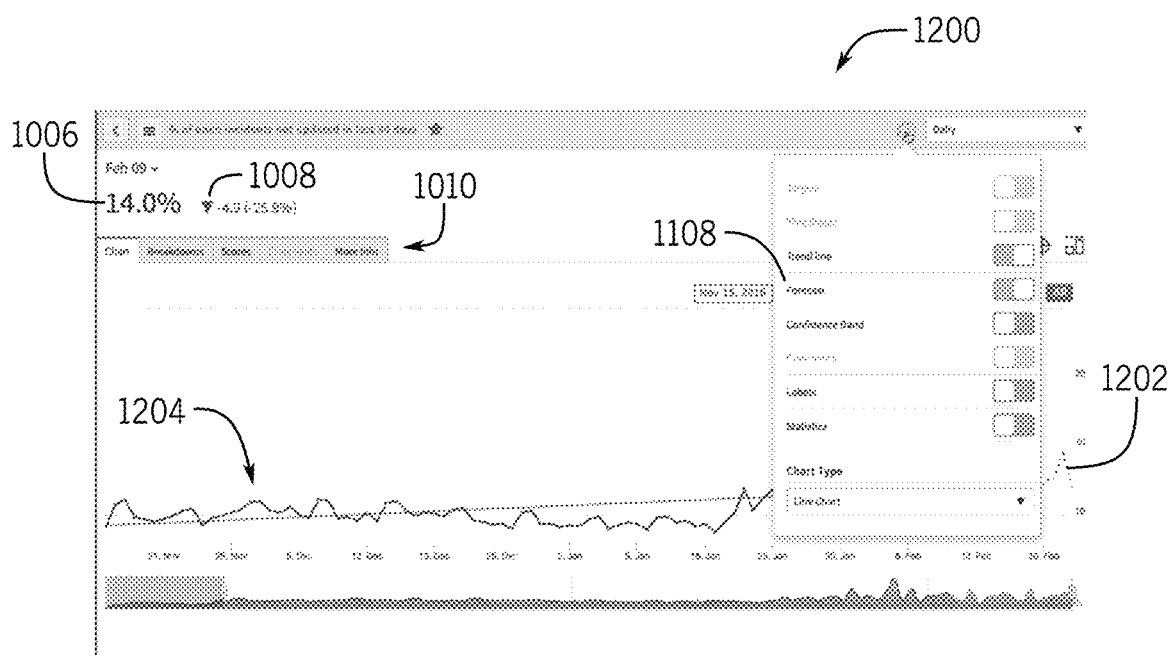
FIG. 12 is an illustration of a GUI where forecast analytics are triggered by selecting a forecast option in the dashboard of FIG. 4, in accordance with an embodiment.

Additional options may be selectable. For example, in FIG. 11, the GUI 1100 provides a configuration menu 1102, triggered by a configuration icon 1104. As illustrated, the trend visualization (e.g., the trend 908) may be selectively turned on or off using a trend option 1106. Forecasting (e.g., predicting future data) may be selectively turned on or off using a forecast option 1108. Other options, such as visualization of a confidence band, labels, and/or statistics may also be selectively turned on or off. Further, the chart type may be changed from a line chart to other forms of charts (e.g., bar chart) using the chart type option 1110. In GUI 1200 of FIG. 12, the forecast analytics are triggered by selecting the forecast option 1108. Then, a forecast analytics is run and forecasting data 1202 is presented in a line chart 1204.

Figure 13:
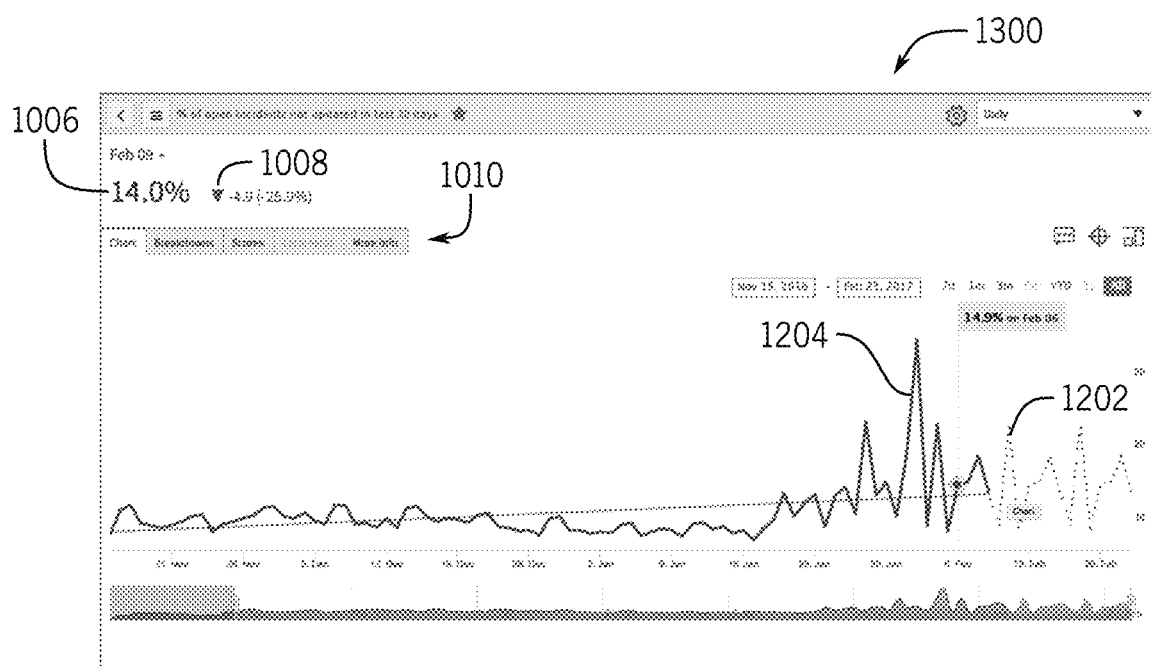
FIG. 13 is an illustration of a GUI where the configuration menu of FIG. 11 is removed and showing forecasting data results from the triggered forecast analytics, in accordance with an embodiment.

FIG. 13 is an illustration of a GUI 1300 where the configuration menu 1102 is removed, showing the forecasting data 1202 results from the triggered forecast analytics. As illustrated, the forecasting data 1202 may be differentiated from observed data in the line chart 1204. For example, the forecasting data 1202 may be represented differently than the historical data in the line chart 1204, such as by presenting the forecasting data 1202 in a different color, as a dashed line, or other differentiation from the historical data in the line chart 1204. When predictions are triggered, the historical data may be mined for data patterns in the historical data. Based upon the observed patterns, the time-series data may be classified into one of multiple classification types. For example, the historical data may be classified as data having seasonal components (i.e., certain commonalities at certain times), near constant data (i.e., retaining nearly the same values over time), trending data, data that switches between two or more states, and/or categorical data (i.e., data that includes a set of discrete values). The classification may be used to analyze and estimate data forecasts. The forecasting data 1202 may be used to predict when certain targets and/or thresholds may be met.

Figure 14:
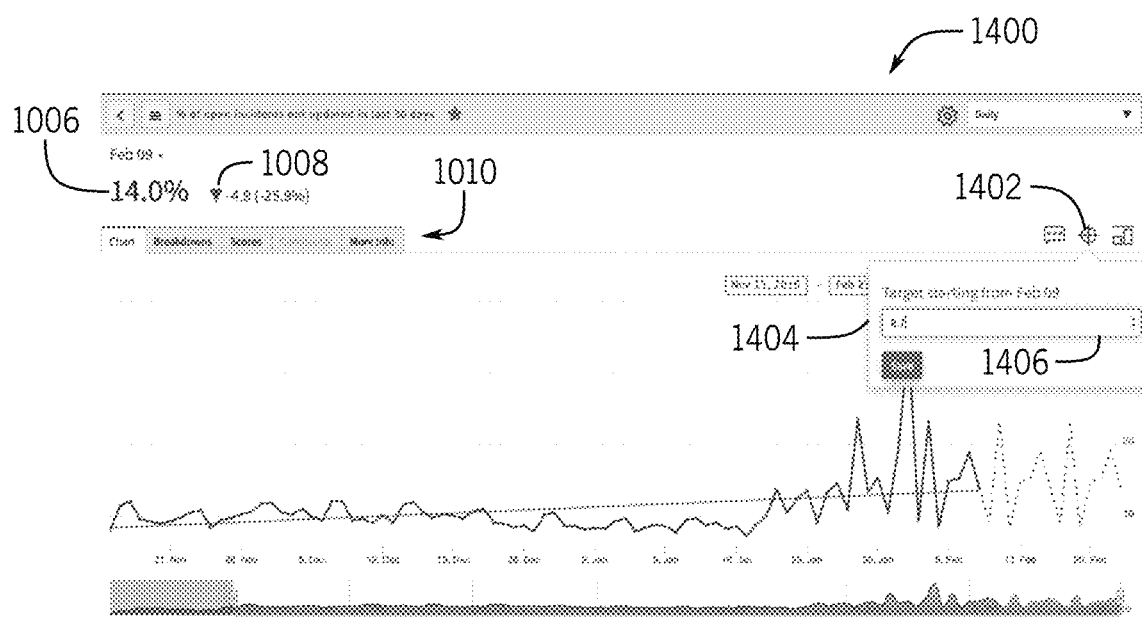
FIG. 14 is an illustration of a GUI with target prediction in the dashboard of FIG. 4, in accordance with an embodiment.

FIG. 14 illustrates a GUI 1400 with target prediction. Target prediction may be triggered by selecting a targeting icon 1402. Upon selection of the targeting icon 1402, a target dialog box 1404 may be presented. The target dialog box 1404 may include a prompt of a configuration option 1406 for input of a target value. Once the target value (e.g., 8.7) is entered and saved, the GUI 1400 may provide an indication of when the target will be met. In some embodiments, the target may include global targets and/or personal targets. For example, a global target may be set by an administrator for all users, users of a certain group, and/or other groups that may have a common target. The personal targets may be set using the target dialog box 1404 by a user for himself or herself.

Figure 15:
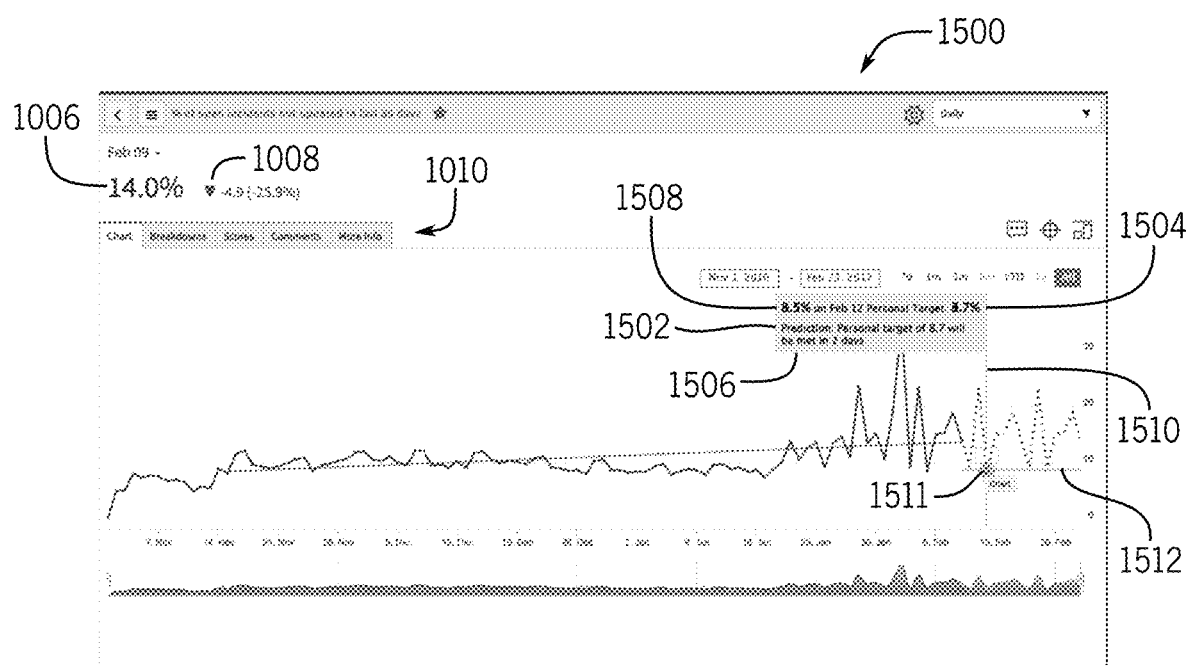
FIG. 15 is an illustration of a GUI where a target prediction box is presented based upon a target value entered in the GUI of FIG. 14, in accordance with an embodiment.

FIG. 15 illustrates a GUI 1500 where a target prediction box 1502 is presented based upon the target value input in the target dialog box 1404 of FIG. 14. In certain embodiments, the target prediction box 1502 may include an indication 1504 of the target value input into the target dialog box 1404, an indication 1506 of a date and/or time when the target value is predicted to be met, and an indication 1508 of an actual forecasted value for the date and/or time. The target prediction box 1502 may include a pointer 1510 and point 1511 that indicates the time and/or point on the chart where the target is met. Further, in some embodiments, a target visualization 1512 may be included to provide a visual representation of the previously submitted target value input. In some embodiments, the target may have been achieved in the historical data. The target may be represented in the historical data (e.g., solid line portion) rather than the predicted data (e.g., dashed line portion).

Figure 16:
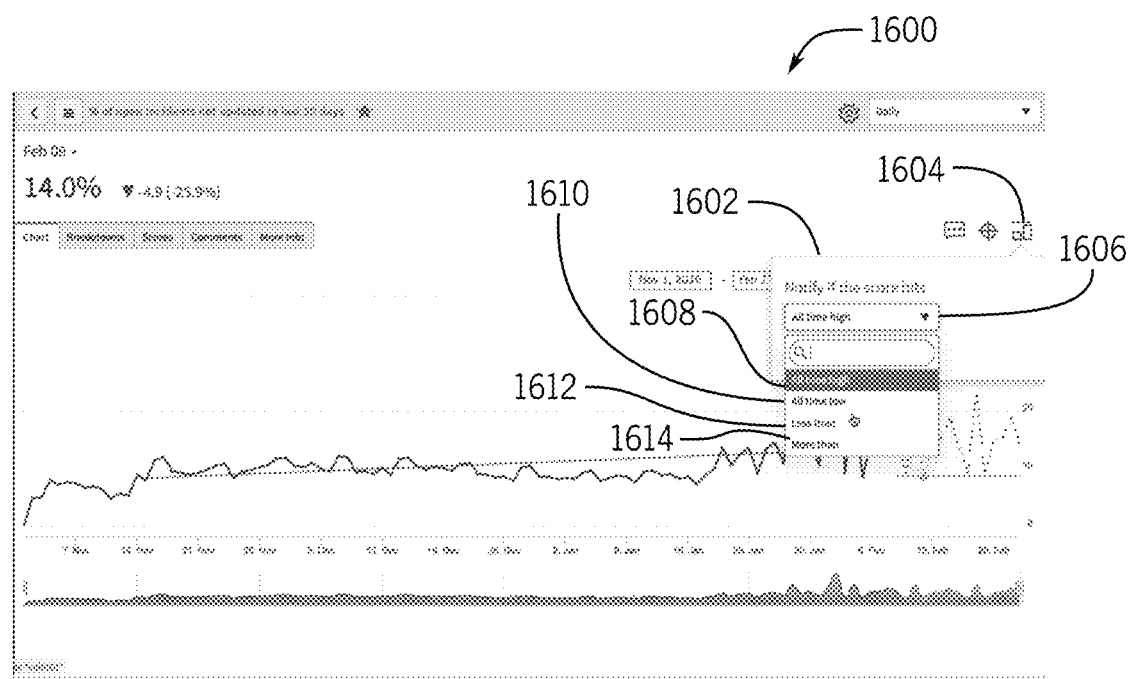
FIG. 16 is an illustration of a notification dialog box triggered by selecting a notification icon in the dashboard of FIG. 4, in accordance with an embodiment.
Figure 17:
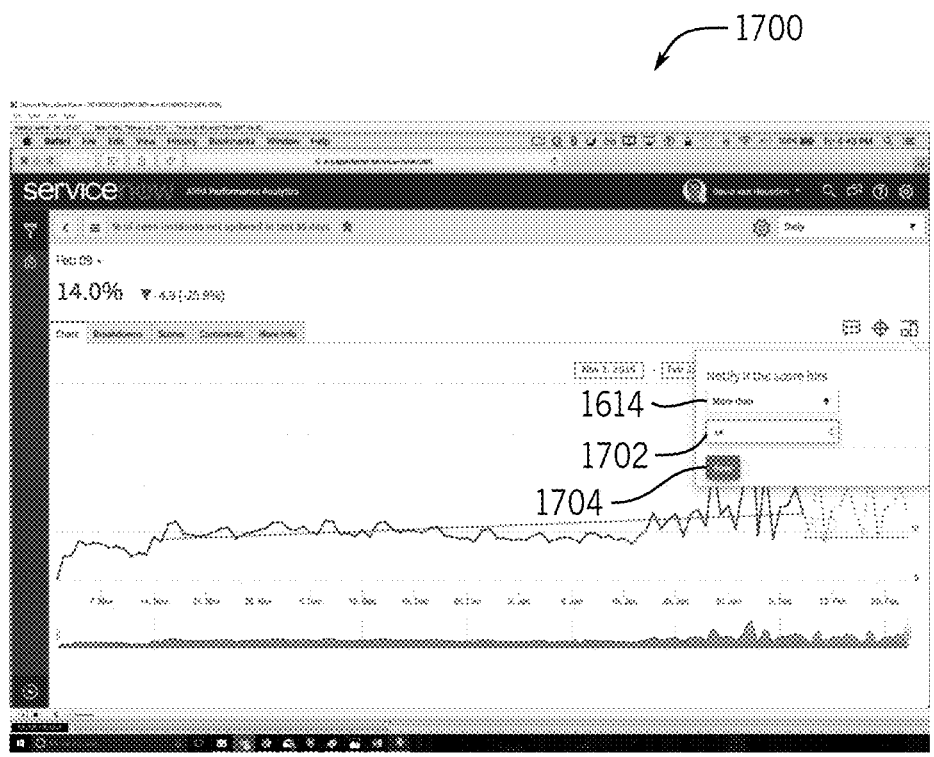
FIG. 17 is an illustration of a GUI presented in response to selection in the notification dialog box of FIG. 16, in accordance with an embodiment.

In some embodiments, notifications may be provided to indicate when the target and/or a notification point has been and/or is predicted to be reached. For example, the notifications may include text messages, email notifications, automated phone calls, app notifications, and/or other notification methods that may be suitable for contacting/updating a user. As noted, these notifications may be triggered based upon certain criteria. For example, GUI 1600 of FIG. 16 presents a notification dialog box 1602 when triggered by selecting a notification icon 1602. In some embodiments, notification criteria may be selected from a selection box 1606. The selection box 1606 may enable selection of an all-time high option 1608, an all-time low option 1610, a less than option 1612, and a more than option 1614. The all-time high option 1608 triggers a notification if the time-series data crosses an all-time high value for the time-series data. The all-time low option 1610 triggers a notification if the time-series data crosses an all-time low value for the time-series data. The less than option 1612 triggers a notification when the time-series data falls below a specified lower threshold. The more than option 1614 triggers a notification when the time-series data crosses a specified upper threshold. For example, in the GUI 1700 of FIG. 17, when the more than option 1614 is selected, an additional prompt 1702 is provided, enabling input of an threshold value (e.g., 14) that may be saved using a save button 1704. Similar to the target, the notifications may be personal and/or globally set.

Figure 18:
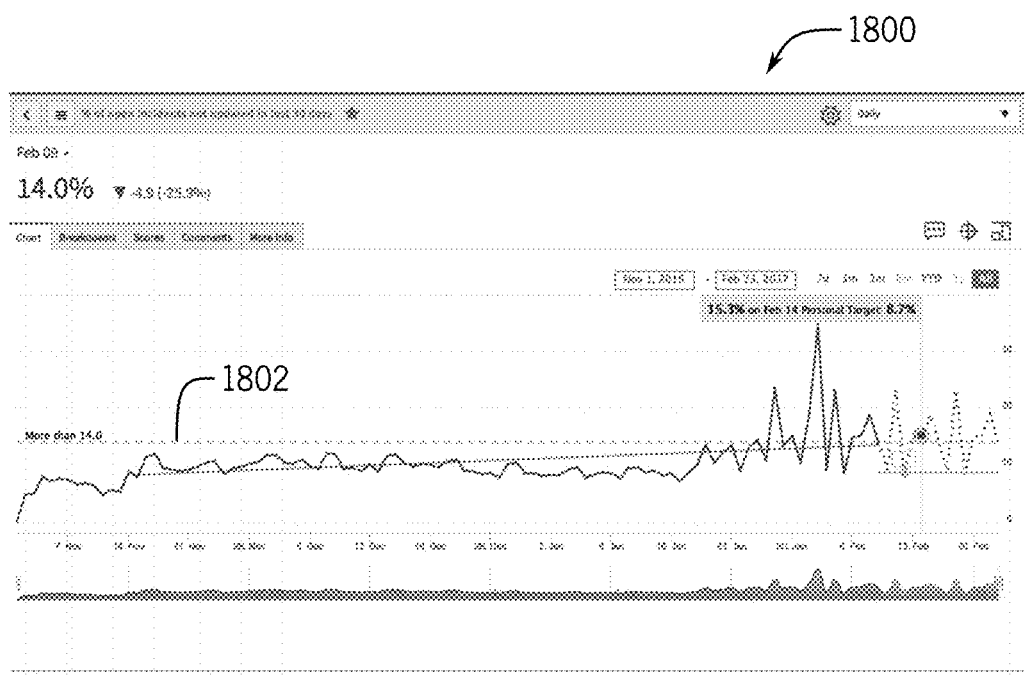
FIG. 18 is an illustration of a GUI that provides a more than threshold indicator in response to selection in the notification dialog box of FIG. 16, in accordance with an embodiment.

In some embodiments, once the notification criteria are set, a visualization of the threshold may be provided. For example, in FIG. 18, a GUI 1800 provides a more than threshold indicator 1802. Additionally or alternatively, the GUI 1800 could include less than thresholds (personal and/or global), more than thresholds (personal and/or global), all-time high thresholds (personal and/or global), all-time low thresholds (personal and/or global), targets (personal and/or global), or any combination thereof. Accordingly, each GUI scorecard (e.g., GUI 1800) of an indicator may potentially include numerous potential pieces of data with potential multitudes of indicators and potential multitudes of breakdowns for each indicator. For example, the indicators may be broken down by dimensions of the indicators, priority classification, category of indicator, assignment group to which the indicator is assigned, severity of the indicator, location corresponding to the indicator, or any other suitable breakdowns for analyzing the indicators. Thus, the performance analytics engine may include vast amounts of data that may be divided among multiple different pages that may not be readily consumed by users or administrators due to the large number (e.g., thousands) of individual pages showing such information. Accordingly, as discussed below, data insights may provide a suitable brief representation of the most pertinent items (e.g., indicators, breakdowns) and their respective measurements (e.g., targets, notification thresholds, change percentages, etc.).

Data Insights

A data insights widget provides a customer/user a single widget in which interesting changes (e.g., thresholds, targets, etc.) in the time-series data may be viewed. In some embodiments, this widget may be generated and presented without any additional configuration from the customer/viewer. The interesting data ("news") may be presented in "headlines" for the various indicators and their corresponding measurements in the data insights widget. In some embodiments, this widget and its headlines may be computed periodically. For instance, in some embodiments, the headlines may be computed at the end of each day, weekly, every certain number of hours, and/or any other suitable variable of time for recomputing the headlines. As appreciated, since a large amount of data may be recomputed for the data insights widget, the frequency of recomputation may be balanced against performance drains due to the recomputations. As noted below, in some embodiments, these headlines may be selected in the widget to open the corresponding scorecard GUI (e.g., GUI 1800). Additionally or alternatively, the widget may provide headlines that indicate that an indicator has interesting data to cause the user/customer to direct their attention to the indicator type and navigate to the indicator type scorecard GUI through the performance analytics interface. In other words, the data insights widget may enable reviewing of most pertinent information without presenting non-pertinent information. In other words, the data insights widget removes the haystack from a proverbial needle in a haystack situation.

Figure 19:
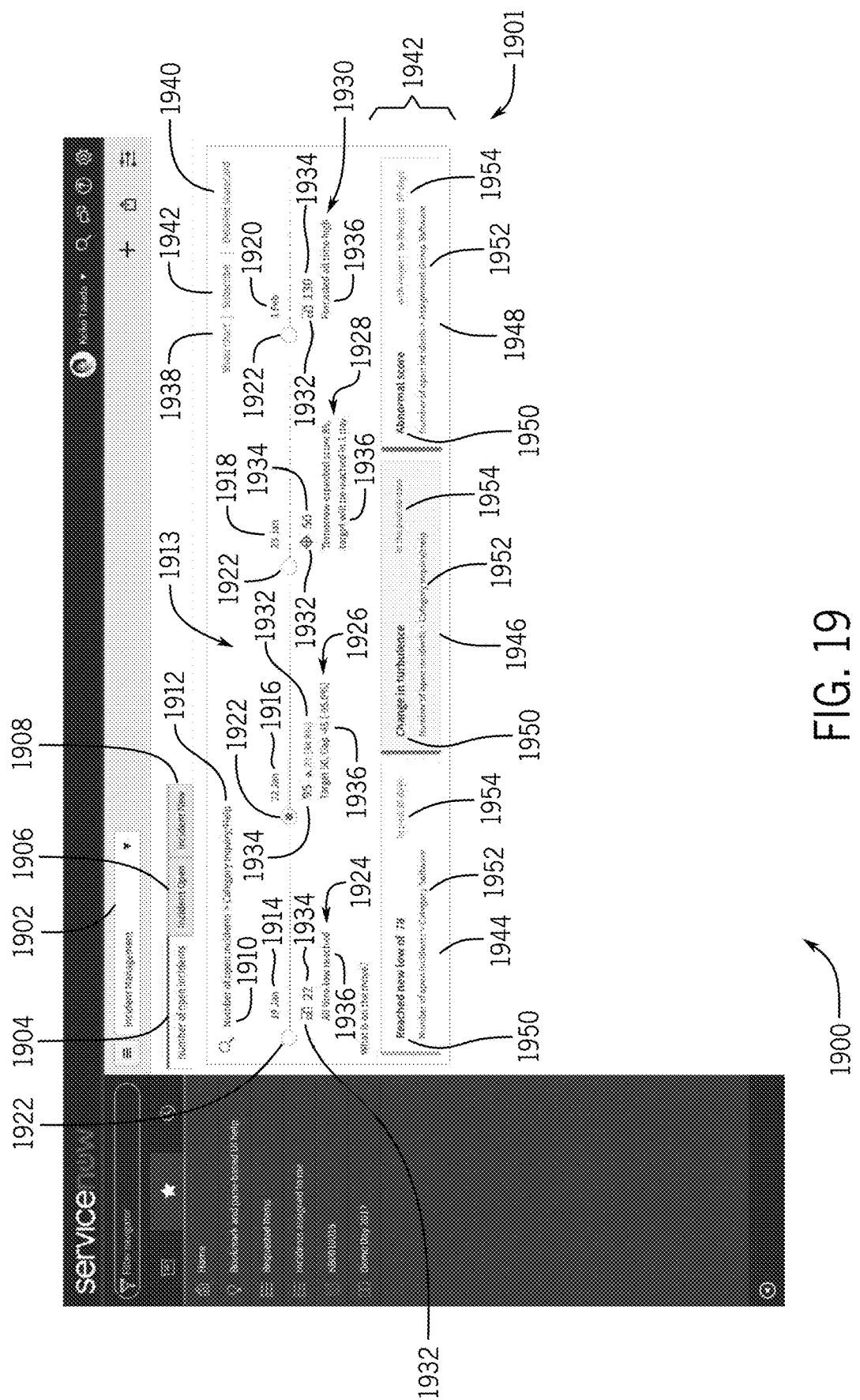
FIG. 19 is an illustration of a GUI showing a data insights widget in the dashboard of FIG. 4, in accordance with an embodiment.

FIG. 19 illustrates a GUI 1900 showing a data insights widget 1901. The GUI 1900 includes a drop down menu 1902 that enables selection of an indicator type/group of indicator types, such as incident management that may be used to view/edit corresponding indicator types. For example, in the GUI 1900 corresponding to a selection of incident management in the drop down menu 1902, the GUI 1900 may include a number of open incidents tab 1904, an incident open tab 1906, and an incident new tab 1908. The number of open incidents tab 1904 may be used to present the data insights widget 1901 for open incidents. The incident open tab 1906 may be used to open a specific indicator, such as by opening specific scorecards for an indicator type and/or its sub-group breakdowns. The incident new tab 1908 may be used to view new incidents that have occurred in a recent (e.g., 5 days, 30 days, etc.) and/or add new incidents.

Within the number of open incidents tab 1904, a title 1910 is presented that indicates what is being viewed in the data insights widget 1901. For example, in the illustrated embodiments, the title 1910 indicates that the number of open incidents is being viewed. Furthermore, in the illustrated embodiment, the title 1910 includes a sub-title 1912 that indicates a breakdown of the indicator corresponding to the title 1910 into a category of inquiry/help type incidents. Additionally or alternatively, the breakdown may include groups/individuals to which the incidents are assigned, types of incidents, time periods, user-defined breakdowns, and/or any other suitable divisions that may be helpful to examine for the specific indicator type/group being viewed in the data insights widget 1901. In the breakdown indicated in the sub-title 1912, multiple days may be presented in a timeline 1913 that includes various days 1914, 1916, 1918, and 1920. However, in some embodiments, the timeline 1913 may include different divisions, such as hours or days. Indeed, in certain embodiments, the divisions may be selectable in the data insights widget 1901. Moreover, although the illustrated timeline 1913 includes separate periods (e.g., days) having a similar length, the timeline 1913 may include varying lengths between periods. For example, the timeline 1913 may include one entry for a current day and another entry for a past week. The timeline 1913 may present selection buttons 1922 (e.g., radio buttons) that enable selection of entries in the timeline 1913.

The timeline 1913 may also provide data insights 1924, 1926, 1928, and 1930 that are selected based at least in part into most interesting based on scoring. For example, each insight may include an icon 1932 that enables quick identification of a type of insight. For example, the icon 1932 may be a bar graph when a threshold has been reached/is predicted to be reached, may be a crosshair when a target has been reached/is predicted to be reached, may be an arrow when a target/threshold is predicted, and/or other icons that may be used to indicate to what the corresponding insights 1924, 1926, 1928, and 1930 correspond. Each insight may also include a score 1934 that indicates a score for the data insight. For example, the score 1934 may indicate a value for the corresponding statistic. For instance, when an insight an all-time low/low threshold, the score 1934 may be the actual number for the threshold that is reached/predicted to be reached. When the insight is a target, the score 1934 may be the difference (total-number-based or percentage-based) between the target and the current value. In other words, the difference may be the number of items (e.g., open records) or a percentage of the target (e.g., 95% of target) that is between the current value and the target. The insights may also include a brief description 1936 that explains to what the score 1934 corresponds.

Within the data insights widget 1901, the entries in the timeline 1913 may be selected and acted upon. For example, an entry may be selected using the buttons 1922 and have a corresponding chart displayed by selecting a show chart button 1938. Similarly, an entry may be selected using the buttons 1922 and have a corresponding scorecard (e.g., GUI 1800) displayed by selecting a show scorecard button 1940. Furthermore, an entry may be selected using the buttons 1922 and a user may subscribe to the corresponding statistic using a subscribe button 1942.

Whichever entry is selected using the buttons 1922 may cause the data insights widget 1901 to display additional insights 1944, 1946, and 1948 for the selected entry in the timeline 1913. The additional insights 1944, 1946, and 1948 may provide additional information about the breakdown and/or insight type for the selected entry. The insights 1944, 1946, and 1948 may each include a title 1950 indicating a type of insight. As discussed below, the insight types of the insights 1944, 1946, and 1948 may include a different type than those shown in the insights 1924, 1926, 1928, and 1930. For example, the insights 1924, 1926, 1928, and 1930 may include simple analysis, such as targets and thresholds whether predicted or measured. In some embodiments, the insights 1924, 1926, 1928, and 1930 may be those that pass a specific newsworthiness threshold. For example, the predicted occurrence may be less than a threshold number of days from a current day. Additionally or alternatively, the newsworthiness threshold may be that the data has reached an all-time high/low that is higher/lower than any other values in the past threshold number of days. The insights 1944, 1946, and 1948 may include more in-depth analysis, such as volatility, lows/highs over a specified period, whether data is an outlier/abnormal score, or other second-order analysis.

The insights 1944, 1946, and 1948 may also include a description 1952 that indicates an indicator type and/or its breakdown for the insight. The insights 1944, 1946, and 1948 may also include a time indicator 1954 that indicates a time period over which the corresponding insight refers.

Figure 20:
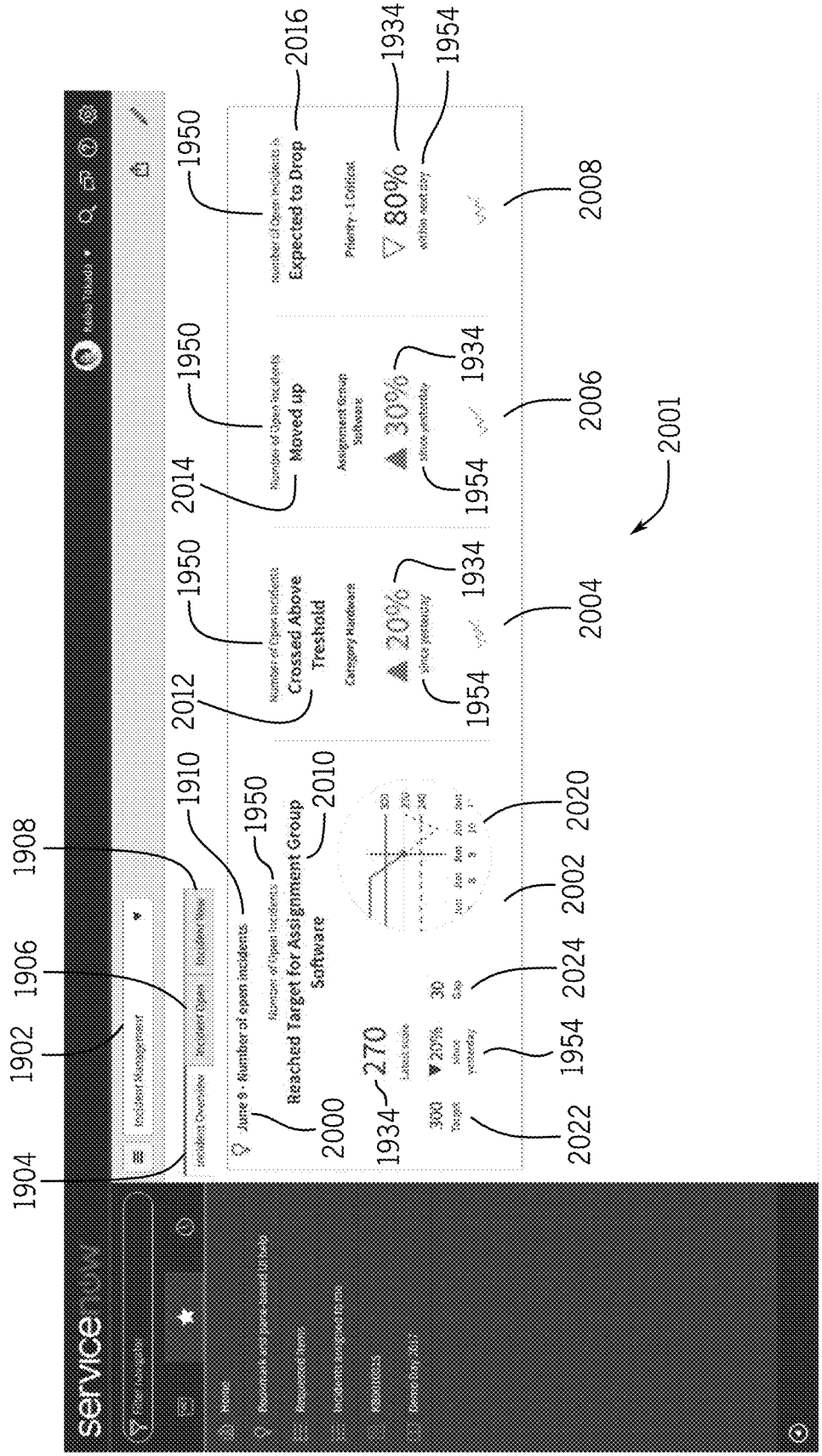
FIG. 20 is an alternative illustration of a GUI showing a data insights widget in the dashboard of FIG. 4, in accordance with an embodiment.

FIG. 20 provides a GUI 2000 that provides an alternative embodiment of the data insights widget 1901 in a data insights widget 2001. As illustrated, the data insights widget 2001 is similar to the data insights widget 1901 with a different arrangement of information. For instance, the data insights widget 2001 includes the drop down menu 1902 that enables selection of an indicator type/group of indicator types, such as incident management that may be used to view/edit corresponding indicator types. Also similar to the data insights widget 1901, the data insights widget 2001 includes the number of open incidents tab 1904, the incident open tab 1906, and the incident new tab 1908 with the number of open incidents tab 1904 including data insights 2002, 2004, 2006, and 2008. The data insights 2002, 2004, 2006, and 2008 includes the title 1950 and the corresponding score 1934. The data insights 2002, 2004, 2006, and 2008 also respectively include sub-titles 2010, 2012, 2014, and 2016 that provide additional details about the respective data insights 2002, 2004, 2006, and 2008. As illustrated in the data insights widget 2001, at least one insight may include additional details that are not included for other insights. For example, the data insight 2002 includes a graph 2020, a target 2022, and a difference 2024. In some embodiments, these additional details may be invoked using the show chart button 1938 of GUI 1900 of FIG. 19. In some embodiments, the graph 2020 may illustrate historical data and/or predicted data corresponding to the title 1950 and the sub-title 2010. The target 2022 may display a global and/or personal targets or thresholds for the indicator group or breakdown corresponding to the sub-title 2010.

Figure 21:
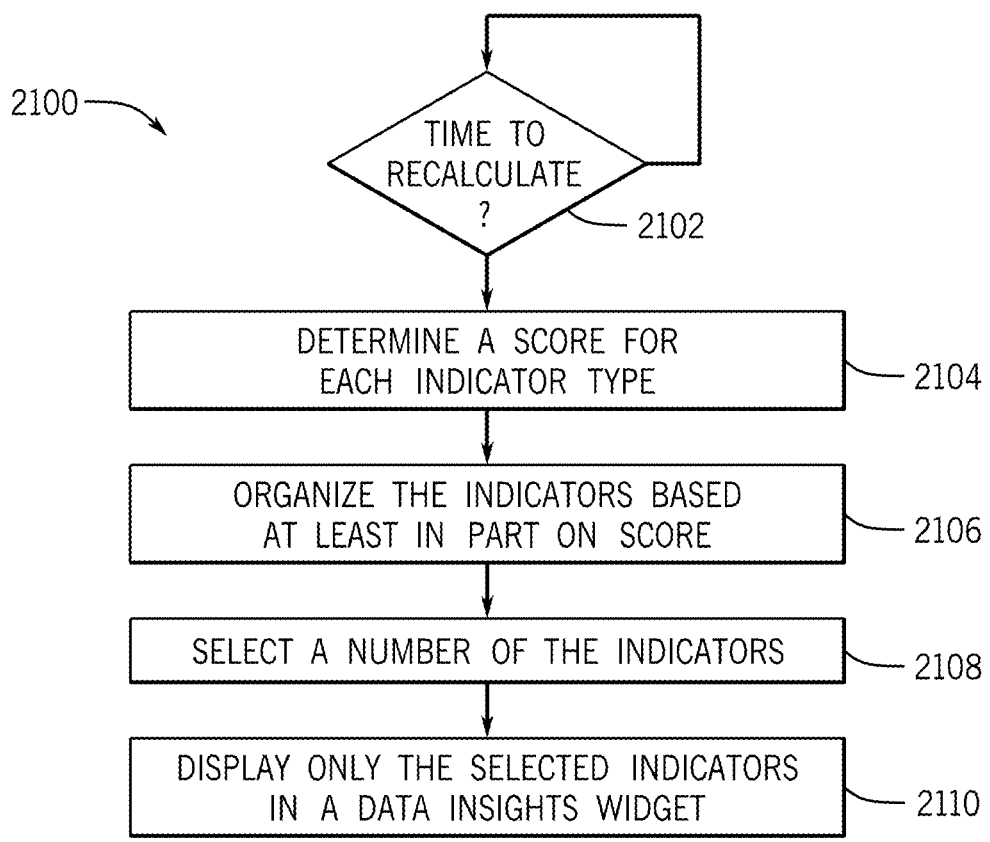
FIG. 21 is a flow diagram of a process for implementing the data insights widget of FIGS. 19 and 20, in accordance with an embodiment.

FIG. 21 is a flow diagram of a process 2100 for implementing the data insights widget 2001. The platform 104 may wait until a time to recalculate has been reached (block 2102). For example, data may be retrieved for one or more instances running on the platform periodically and/or in response to manual invocation of the retrieval. For instance, the period may include day(s), week(s), and hour(s). Moreover, the period may include a time (e.g., overnight) where a load on the platform may be expected to be small. Furthermore, in some embodiments, the platform 104 may determine whether the instance 130 and/or the platform 104 are experiencing a relatively heavy load before retrieving the data. In such embodiments, when the instance 130 and/or the platform 104 are experiencing a relatively heavy load, the platform 104 may delay retrieval until the load has lessened. Additionally or alternatively, the platform 104 may utilize the retrieval when a relatively low load is experienced on the instance 130 and/or the platform 104.

Once the data is retrieved, the platform 104 determines a score for each indicator type/metric tracked in the data is used to generate a news score (block 2104). As noted below and above, the scores may include a raw number (e.g., number of open incidents) of the indicator/metric, a generated value generated from the raw number using a transfer function for the indicator/metric, a weighting of the raw number/generated value, and/or other computations that may be used to rate "newsworthiness" of data corresponding to the indicator/metric. The indicators/metrics are then organized based at least in part on their scores (block 2106). For example, data entries for each indicator/metric may be stored in a news score database in an ascending or descending order of news scores. At least a portion of the indicators/metrics are selected by the platform based at least in part on their news scores (block 2108). For example, a maximum number of displayed items may be less than the number of indicators/metrics in the portion. Additionally or alternatively, a threshold score may be used to filter out indicators/metrics from the data insights widget if their news score is below the threshold. The selected indicators/metrics are displayed in a data insights widget without displaying other portions of the data (block 2110).

Figure 22:
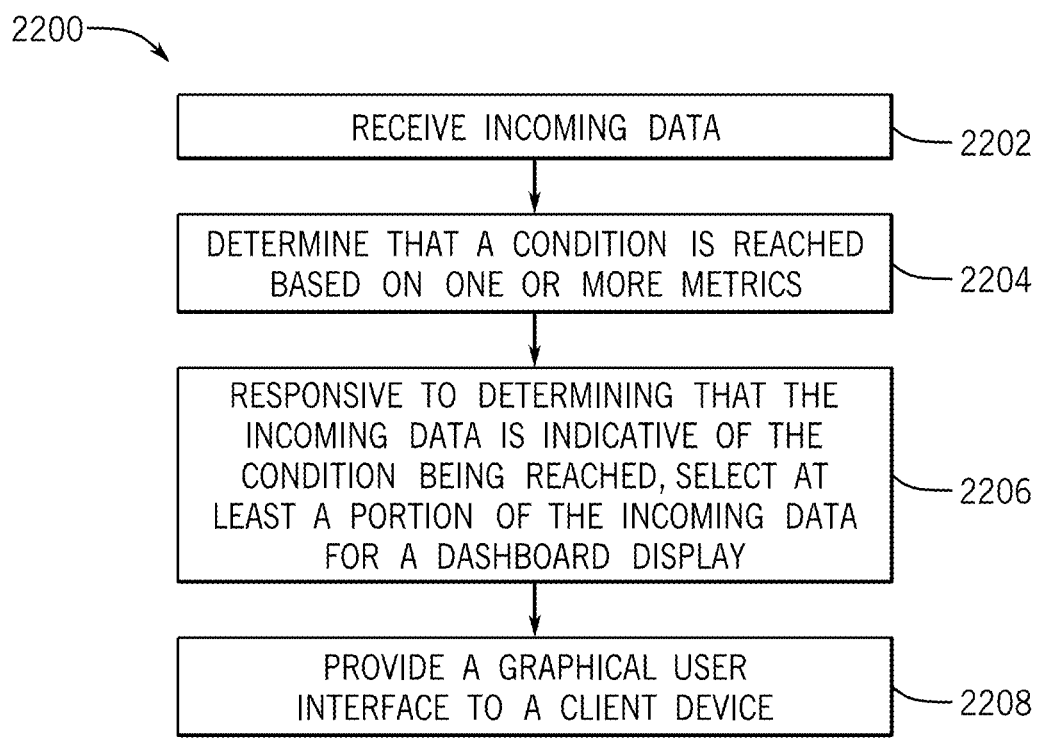
FIG. 22 is a flow diagram of a process for implementing the data insights widget of FIGS. 19 and 20, in accordance with an embodiment.

FIG. 22 is a flow diagram of a process 2200 for implementing the data insights widget 2001. For example, the process 2200 may be performed by the platform 104, where the platform 104 utilizes one or more servers remote from multiple client networks to manage the multiple client networks (e.g., network 112). In some embodiments, the platform (e.g., an enterprise management platform) hosts a respective instance (e.g., instance 130) for each of the multiple client networks. The platform 104 may be configured to receive incoming data (block 2202). The incoming data includes one or more metrics or indicators being tracked in the incoming data by the platform 104. The platform 104 determines that a condition is reached based on the one or more metrics (block 2204). For example, the condition may include a threshold (predicted or previously occurring), a target (predicted or previously occurring), a news score (as discussed below), a user-defined condition, and/or any other conditions that may be tracked for the metrics/indicators.

Responsive to determining that the incoming data is indicative of the condition being reached, the platform 104 selects at least a portion of the incoming data for a dashboard display (block 2206). For example, the dashboard may display one or more widgets, such as a data insights widget that includes the at least a portion of the incoming data. The platform 104 provides a graphical user interface (GUI) to a client device (e.g., the client 102) associated with one of the multiple client networks (block 2208). For example, the representation of the GUI includes a data insights widget of the dashboard that displays the data indicative of the condition being reached without displaying other data in the incoming data that has not reached a level indicative of other conditions.

Dynamic Analytics

As previously noted, the data insights may include targets and thresholds that are ordered based at least in part on their score. However, dynamic insights may be generated for analytics types other than targets and/or thresholds to provide additional insights to enable a user to quickly view changes and/or important events without drilling down and analyzing potentially massive amounts of data manually. Furthermore, these second-tier analytics may include dynamic analysis that is context-driven to provide visibility of changes (e.g., negative movement) for certain breakdowns (e.g., assignment group) of an indicator type (e.g., open incident reports). For instance, these second-tier analytics may provide scoring relative to the specific type of analytics performed for a specific indicator type.

Figure 23:
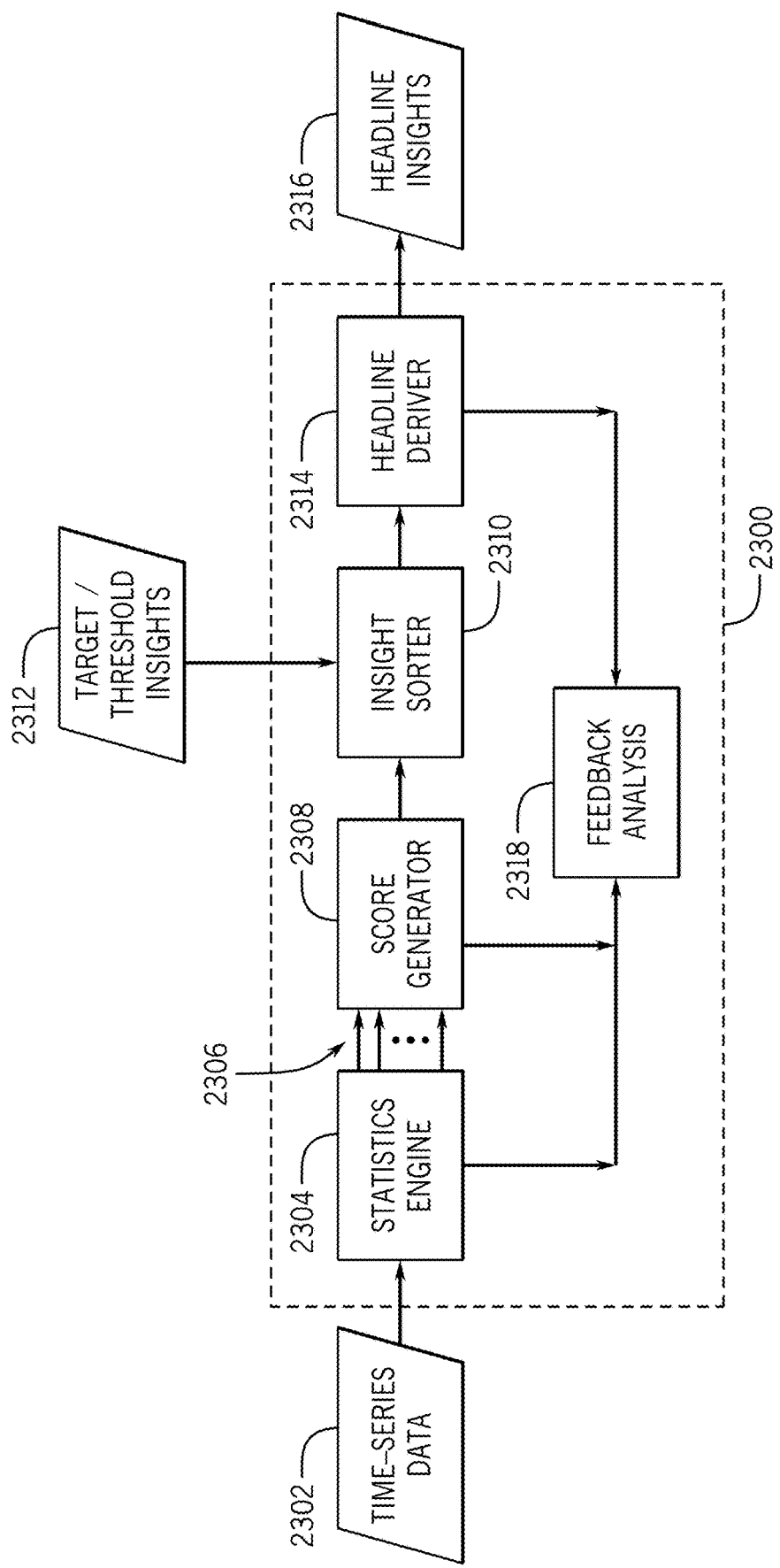
FIG. 23 is a block diagram of a dynamics analytics engine including a statistics engine that may be used to combine various analytics types for the data insights widget of FIGS. 19 and 20, in accordance with an embodiment.

FIG. 23 is a block diagram of a dynamic analytics engine 2300 that may be used to combine various analytic types for the data insights widget 1901, 2001. As illustrated, the dynamic analytics engine 2300 receives time-series data 2302. For example, the time-series data 2302 may include any data corresponding to one or more indicator types that are tracked by/for the system 100, such as a number of incident reports open. The time-series data 2302 may be pulled periodically by the dynamic analytics engine 2300. For example, the dynamic analytics engine 2300 may pull the time-series data 2302 during expected low levels of use (e.g., overnight). Additionally or alternatively, in some embodiments, the dynamic analytics engine 2300 may pull the time-series data 2302 in response to a demand requesting generation of new headlines in the data insights widget 1901, 2001.

The dynamic analytics engine 2300 includes a statistics engine 2304 that generates statistics for one or more indicator types. As discussed below, the statistics engine 2304 may utilize one or more tables to define specific statistics that may be measured and/or tracked in the system 100. For instance, the statistics may track a relative size of change, an amount of change, how long since some occurrence, a variance, an interquartile range, a frequency of permutations of up/down movements over recent time periods, a start or end of a trend in the data, how frequently a target/threshold has been crossed, a change in when a predicted target/threshold crossing is to occur since a period of time (e.g., from previous day to current day), and/or any other statistics that may be used to examine the breakdowns and/or the indicators. The relative size may be decided by diving a size of a last change by an interquartile range to decide if the last change was relatively large. One or more statistics 2306 are passed from the statistics engine 2304 to a score generator 2308. The score generator 2308 normalizes scores for each statistic such that scores for different statistics using a set of rules that may be pre-set and/or dynamically assigned by a user/administrator for the system 100. These scores are passed to an insight sorter 2310 that sorts the insights according to the scores from the score generator 2308. In some embodiments, the target and/or threshold insights 2312 may be passed directly to the insight sorter 2310 with their scores (relative to percentage or overall total values). In some embodiments, scores for the target and/or threshold insights 2312 may be derived from the time-series data 2302 using the score generator 2308 and/or respective rules to have the scores for the target and/or threshold insights 2312 computed. A headline deriver 2314 then selects insights having high enough scores as headline insights 2316 that are to be presented in the data insights widget 1901, 2001.

Figure 24:
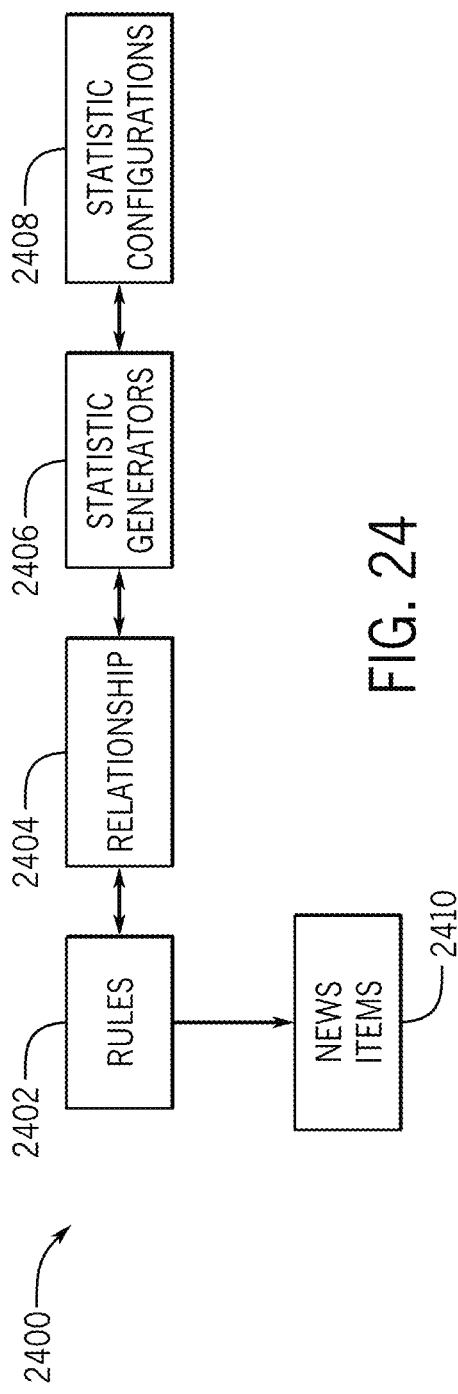
FIG. 24 is a block diagram of databases, including a rules database, that may be used in the statistics engine of FIG. 23, in accordance with an embodiment.

In some embodiments, the statistics engine 2304, the score generator 2308, and/or the headline deriver 2314 may utilize one or more databases to generate the headline insights. FIG. 24 illustrates an example embodiment of databases 2400 that may be used in the statistics engine 2304, the score generator 2308, and/or the headline deriver 2314. The databases 2400 include a rules database 2402, a relationship database 2404, a statistic generators database 2406, a statistic configurations database 2408, and a news items database 2410. The rules database 2402 includes definitions of different types of news that may be generated. The relationship database 2404 provides mapping relationship between rules in the rules database 2402 and statistic generators in the statistic generators database 2406. The statistic generators database 2406 includes definitions of different types of statistics that may be used in the score generation. The statistic configurations database 2408 stores configuration settings for the statistic generators in the statistic generator database 2406. The news items database 2410 stores news items (e.g., the headline insights 2316). In some embodiments, the news items may be stored for a predetermined period of time, such as a number (e.g., 2) weeks or months.

Figure 25:
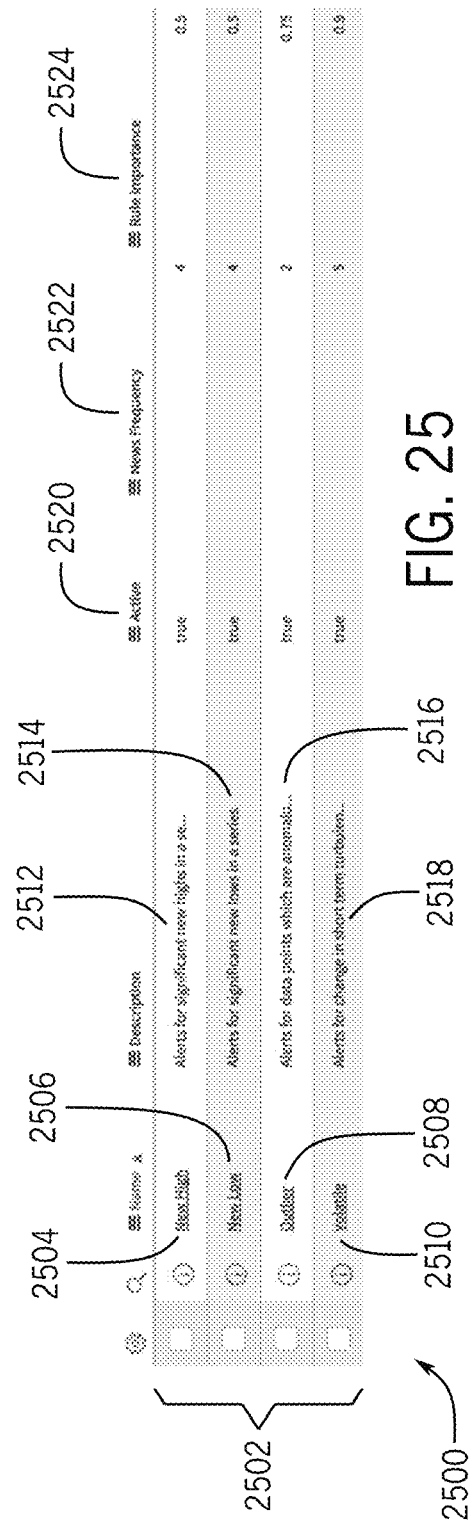
FIG. 25 is an illustration of a GUI that may be used to add/view/change entries in the rules database of FIG. 24, in accordance with an embodiment.

FIG. 25 illustrates a GUI 2500 that may be used to add/view/change entries 2502 in the rules database 2402. The entries 2502 may include a respective entry for each rule. These respective rules may be identified using respective names 2504, 2506, 2508, and 2510 that identify the underlying rules, respectively. The names 2504, 2506, 2508, and 2510 may also correspond to respective descriptions 2512, 2514, 2516, and 2518 that each describes the corresponding rule in more detail that the names 2504, 2506, 2508, and 2510. For example, the entries 2502 include a rule for alerting for a new high value for the indicator type, a rule for alerting for a new low value for the indicator type, a rule for alerting for data points that are anomalous outliers, a rule for alerting for changes in short term turbulence/volatility of an indicatory, and/or other suitable data tracking/analysis mechanisms. Each entry may also include an active flag 2520 that may be set to one value (e.g., true or 1) when the rule is to be used and another value (e.g., false or 0) when the rule is not to be used in deriving news from the time-series data 2302. The GUI 2500 may also be used to view/change a news frequency setting 2522. The news frequency setting 2522 is how many multiples of a period of time (e.g., days, weeks, etc.) before a user gets a news item for a rule of a same or lower level of importance after a prior news item for the rule and indicator/breakdown has been shown. In other words, the news frequency setting 2522 sets how long a "snooze" occurs after a rule has generated a news item before it is shown again without a change in scoring (e.g., worsening) of the condition. The importance of the rule may be set dynamically in the GUI 2500 using a rule importance field 2524. In the illustrated embodiment, the rule importance setting 2524 may be populated with a value between a first value (e.g., 0) and a second value (e.g., 1) that provides news score weighting when sorting the corresponding rules. In some embodiments, the weighting and/or dynamic enablement of the rules may also be applied to visibility of thresholds and/or targets in the data insights widget 1901, 2001.

Figure 26:
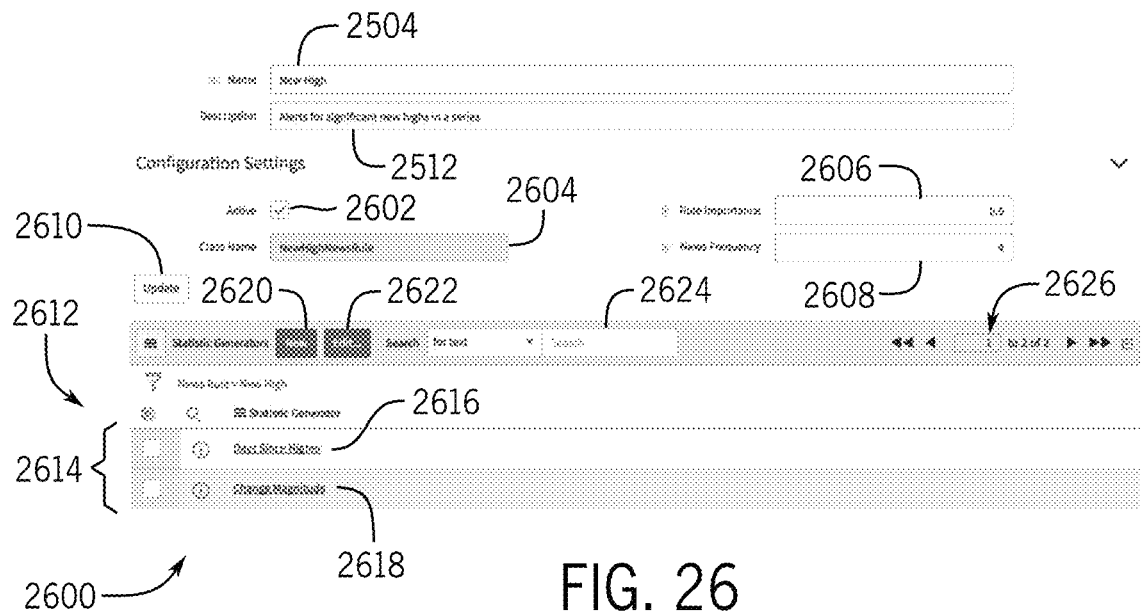
FIG. 26 is an illustration of a GUI for setting configuration details about the entries of FIG. 25 including statistic generators, in accordance with an embodiment.

The relationship database 2404 may include the name (e.g., name 2504) of a rule in the rules database 2402 and maps the entry to a statistic generator entry in the statistic generators database 2406 and/or the statistic configurations database 2408. The rule may have its relationship, statistic generator(s), and its configurations set using a GUI, such as the GUI 2600 of FIG. 26. The GUI 2600 may display/enable editing of the name 2504 and the description 2512 of the GUI 2500 of FIG. 25. Furthermore, the GUI 2600 may include an active button 2602 that may be used to flag whether the rule is currently active for generating insights in the data insights widget 1901, 2001. This change will toggle the active flag 2520 of the corresponding rule in the GUI 2500 of FIG. 25. The GUI 2600 may also include a class name 2604 that may be used to classify the rule in a class of rules. A rule importance field 2606 may be used to view/change the rule importance field 2524 of the GUI 2500 of FIG. 25. Similarly, a news frequency field 2608 may be used to view/change the news frequency setting 2522 of the GUI 2500 of FIG. 25. The GUI 2600 may also include an update button 2610 to save any changes to the name 2504, the description 2512, the active button 2602, the class name 2604, the rule importance field, and/or the news frequency field 2608.

The GUI 2600 may also include a statistic generator table 2612 that includes statistic generator entries 2614. For example, for the rule "New High," the entries 2614 include a days since higher statistic generator 2616 that tracks a length of time since a previous higher value has occurred. The "New High" rule also includes a change magnitude statistic generator 2618 that indicates how much a value of the indicator for the rule has changed in magnitude from a previous high. New statistic generators may be created using a new statistic generator button 2620. Similarly, a currently selected entry 2614 may be edited using an edit button 2622.

Since a rule may potentially have numerous associated statistic generators associated therewith, the GUI 2600 may include a search bar 2624 to enable searching the entries 2614 to find a specific entry. Furthermore, the GUI 2600 may include a navigation bar 2626 to navigate through the potentially large number of entries 2614. Any changes may be saved using the update button 2610 and stored in the statistic generator database 2406.

Figure 27:
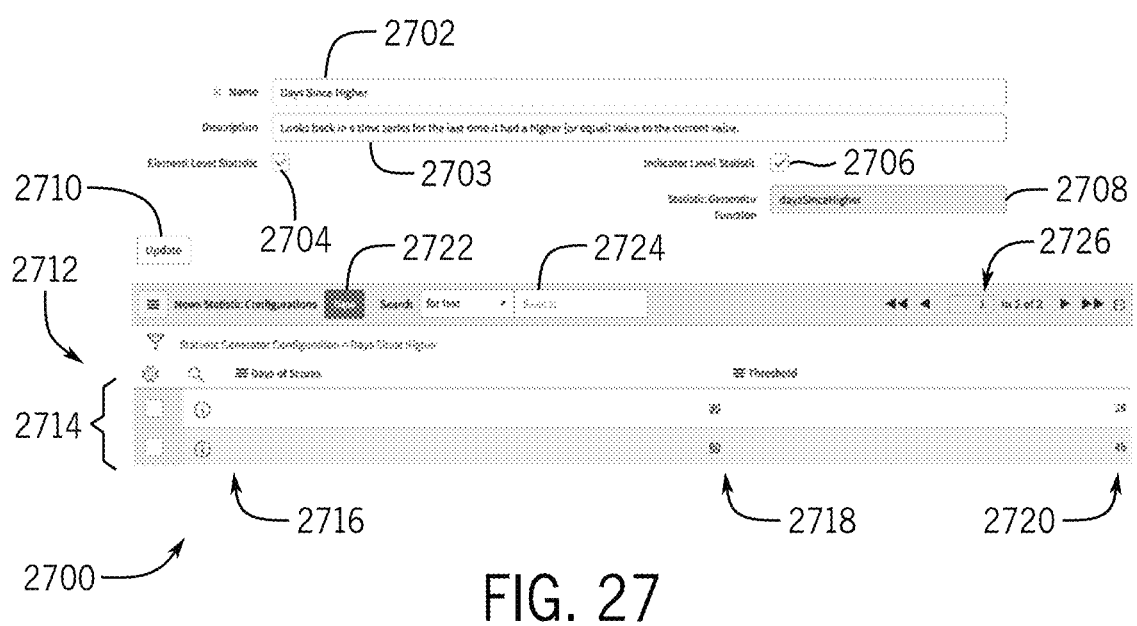
FIG. 27 is an illustration of a GUI that may be used to configure statistic generators of FIG. 26, in accordance with an embodiment.

When the new statistic generator button 2620 is selected or the edit button 2622 is selected a statistic generation GUI may be presented. For example, FIG. 27 illustrates a GUI 2700 that may be used to configure a statistic generator entry, such as the days since higher statistic generator 2616 of FIG. 26. As illustrated, the GUI 2700 includes a name field 2702 that may be used to name the statistic generator and a description field 2703 that provides a brief description of the statistic generator. The GUI 2700 may also be used to define at what level the statistic is to be generated. For instance, the GUI 2700 may include an element level statistic button 2704 that may be used to set whether the statistic is to be calculated at a breakdown level. Similarly, the GUI 2700 may include an indicator level statistic button 2706 that may be used to set whether the statistic is to be calculated at the indicator level. In other words, in the illustrated GUI 2700, days since higher statistic may be generated for breakdowns and indicators due to the selection of the element level statistic button 2704 and the indicator level statistic button 2706. The GUI 2700 may also include a statistic generator function name 2708 that indicates a function name for the statistic. The GUI 2700 may include an update button 2710 that may be used to update the statistic generator with any changes in the GUI 2700.

The GUI 2700 includes a configuration table 2712 that includes entries 2714. The entries 2714 include a days of scores column 2716. The days of scores column 2716 indicates a days of scores to be captured before the statistic generator may be used to generate a statistic. The entries 2714 also includes a filter threshold 2718 below which the statistic gets filtered out of the insights in the data insights widget 1901, 2001.

Figure 28:
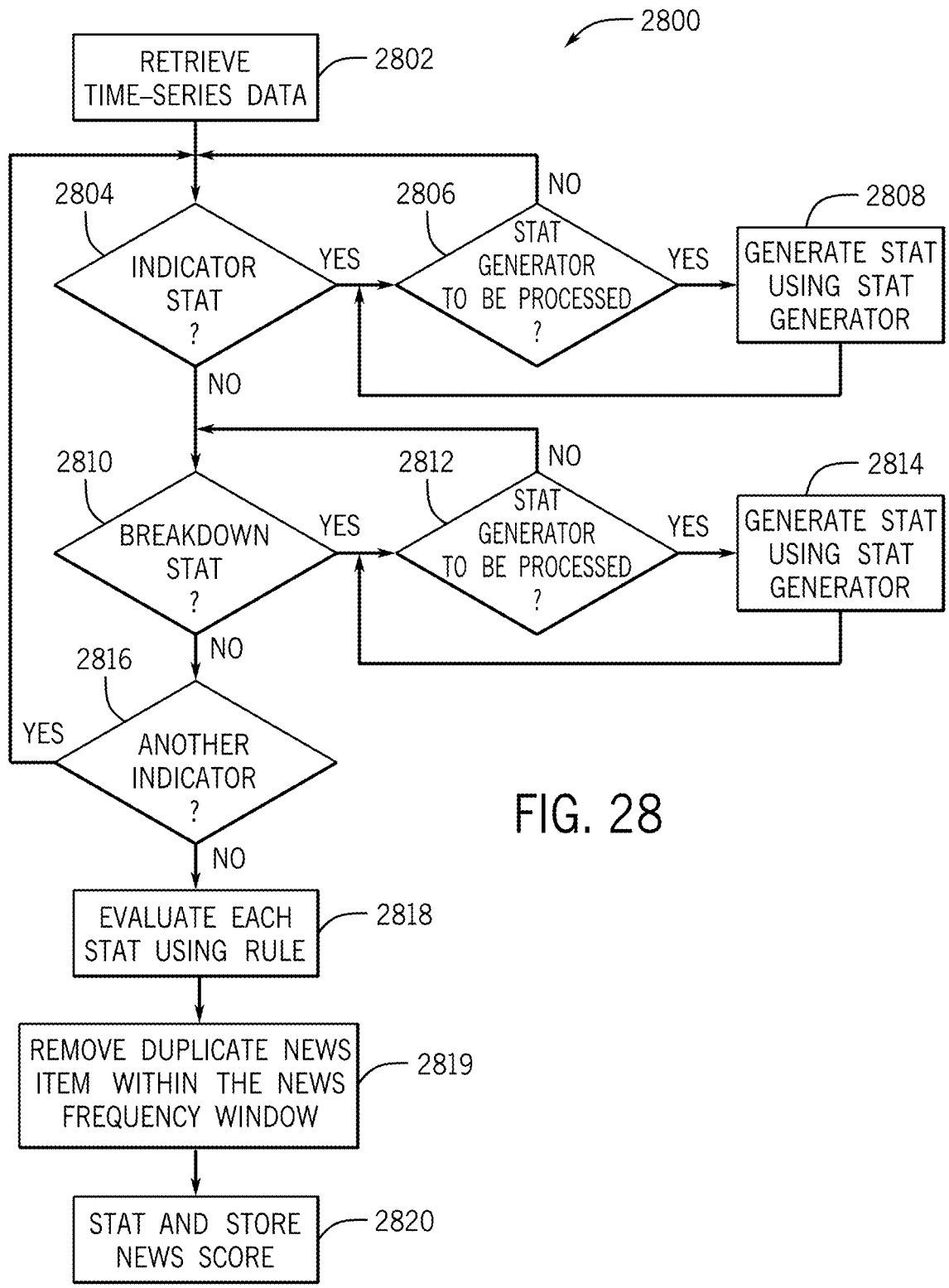
FIG. 28 is a flow diagram of a process that may be used in generating news items for the data insights widget of FIGS. 19 and 20, in accordance with an embodiment.

FIG. 28 is a flow diagram of a process 2800 that may be used in generating news items/data insights for the data insights widget 1901, 2001. The process 2800 may be at least partially performed in the client 102 and/or the platform 104. The process 2800 includes receiving time-series data (block 2802). Receiving the time-series data may include retrieving the time-series data from the databases 108 periodically (e.g., hourly, nightly, weekly, etc.) and/or in response to a manual request to start acquiring data, such as a manual request to update the data insights widget 1901, 2001.

Upon receiving the time-series data, the process 2800 continues with a determination whether an indicator in the time-series data has any associated statistics (block 2804). For example, determining whether the indicator has an associated statistic may include determining whether any statistic generators flagged as indicator level in the GUI 2700. If one or more statistic generators are enabled for the indicator, the platform 104 may determine whether the one or more statistic generators are to be processed (block 2806). For example, the determination may include determining whether the one or more statistic generators are flagged as active in the GUI 2600. For each active and associated statistic generator, a statistic is generated using the corresponding statistic generator (block 2808).

Once the indicator level statistics are generated, statistics may be generated for each designated breakdown of the indicator. The platform 104 determines whether one or more statistic generators are associated with at least one breakdown (block 2810). For each statistic to be generated for each breakdown (block 2812), a corresponding statistic generator may be used to generate the statistic (block 2814). Once the platform 104 has consumed all of the active statistic generators to generate all of the active statistics for the indicator and its breakdowns, the platform 104 determines whether statistics for other indicators are to be generated (block 2816). If more indicators are to be evaluated, the process 2800 returns to block 2804.

The platform 104 then generates a score for each statistic using the corresponding rule (block 2818). For instance, the rule may include weighting used to weight the computation and/or other conversions to generate a news score for the statistic. In other words, the platform 104 enables users/administrators to identify some news item rules, indicator types, and/or breakdowns as important news that may be prioritized and viewed in the data insights widget 1901, 2001 before other, less important news items. In other words, the users/administrators may use the platform 104 to flag certain rules, indicator types, and/or breakdowns as key aspects. Additionally or alternatively, the platform 104 may generate the score by using a transfer function to convert a score (e.g., raw number) for the statistic to the news score. For example, the news score may be based on a degree of change relative to changes in the statistic within the window being analyzed, such as dividing the most recent change by an interquartile range to determine the relative degree of change.

The generated news scores may then be filtered to remove duplicate items that have been displayed within a news frequency (block 2819). For example, as previously discussed, the news frequency may be set in the GUI 2600. Furthermore, in some embodiments, the news items may be filtered for duplicate news items within the news frequency for the same type and same (or lower) news score. Moreover, in certain embodiments, the duplicate items may be removed before storage in the news items database 2410, after storage in the news items database 2410, before receiving a request to display news items, and/or after receiving a request to display news items.

The platform 104 stores the news scores in the news items database 2410 (block 2820). In some embodiments, the platform 104 may sort the news items before or after storage in the news items database 2410. For example, the news items may be sorted from low-to-high or high-to-low in the news items database 2410.

Figure 29:
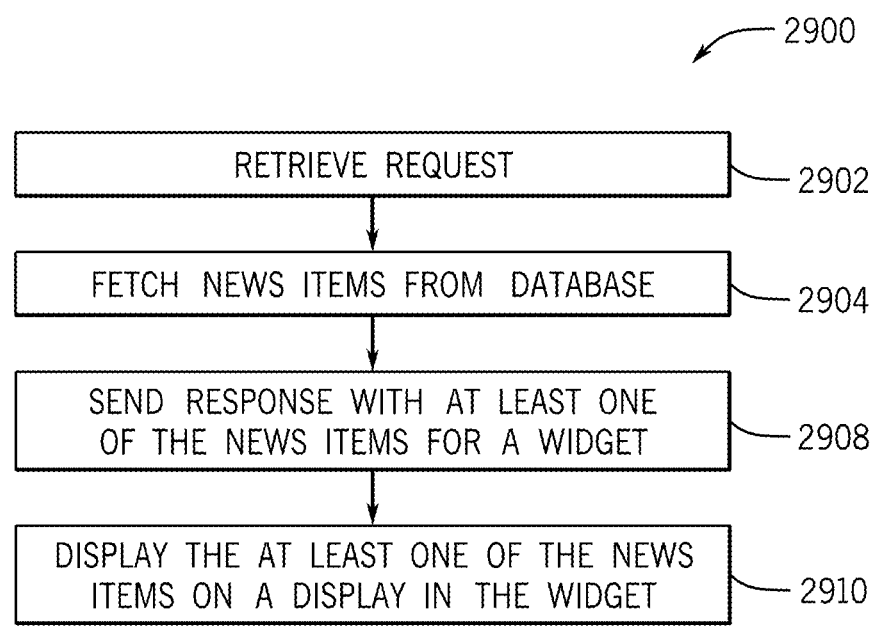
FIG. 29 is a flow diagram of a process that may be used to generate and display news items from a news score database in response to a request, in accordance with an embodiment.

The client 102 and/or servers in the platform 104 may utilize the news items in the news items database 2410. For example, the client 102 and/or servers in the platform 104 may utilize a process 2900 as illustrated in the FIG. 29. The process 2900 begins with receiving a request (block 2902). For example, an application programming interface (API) may be called by the data insights widget 1901, 2001 to access the news items database 2410 to display news items/data insights in the data insights widget 1901, 2001. In some embodiments, the request may include an identifier for an indicator and/or a breakdown being viewed in the data insights widget 1901, 2001. Additionally or alternatively, the request may include a date to be viewed. For example, the indicator, the breakdown, and/or date may include a date selected in the GUI 1900.

In response to the request, the client 102 and/or servers in the platform 104 fetches news from the news items database 2410 (block 2904). In some embodiments, the client 102 and/or servers in the platform 104 fetches a number of news items that are viewable in the data insight widget 1901, 2001. In some embodiments, the client 102 and/or servers in the platform 104 may fetch between a maximum plus a buffer to ensure that some filtration of the news items may still populate the data insights widget 1901, 2001. Additionally or alternatively, the client 102 and/or servers in the platform 104 may fetch all news items above a threshold news score to ensure that any potential news items are fetched even if not all fetched news items are viewable in the data insights widget 1901, 2001.

The client 102 and/or servers in the platform 104 may then send a response to the request with the at least one news item where the at least one news item includes the fetched and filtered news items (block 2908). For example, the response may be an API response to the data insights widget 1901, 2001 that includes the fetched and filtered news items along with scores, additional data, and/or links to additional data about the statistics. In response to some requests, the database 2410 may include no news items and the response would include no news items. Thus, an empty or null response may be sent to the requesting device. Upon receiving the statistic, the data insights widget 1901, 2001 displays the at least one the news items (block 2910). In some embodiments, the response includes one or more news items that are not displayed in the data insights widget 1901, 2001. In some embodiments, the number of news items returned (and displayed) may vary between different requests. For example, on a first day, a request may cause a return of 3 news items, but on a second day, a request may cause a return of a single news item. However, some days as noted above, the request may return no news items and the data insights widget 1901, 2001 may display no news items.

Figure 30:
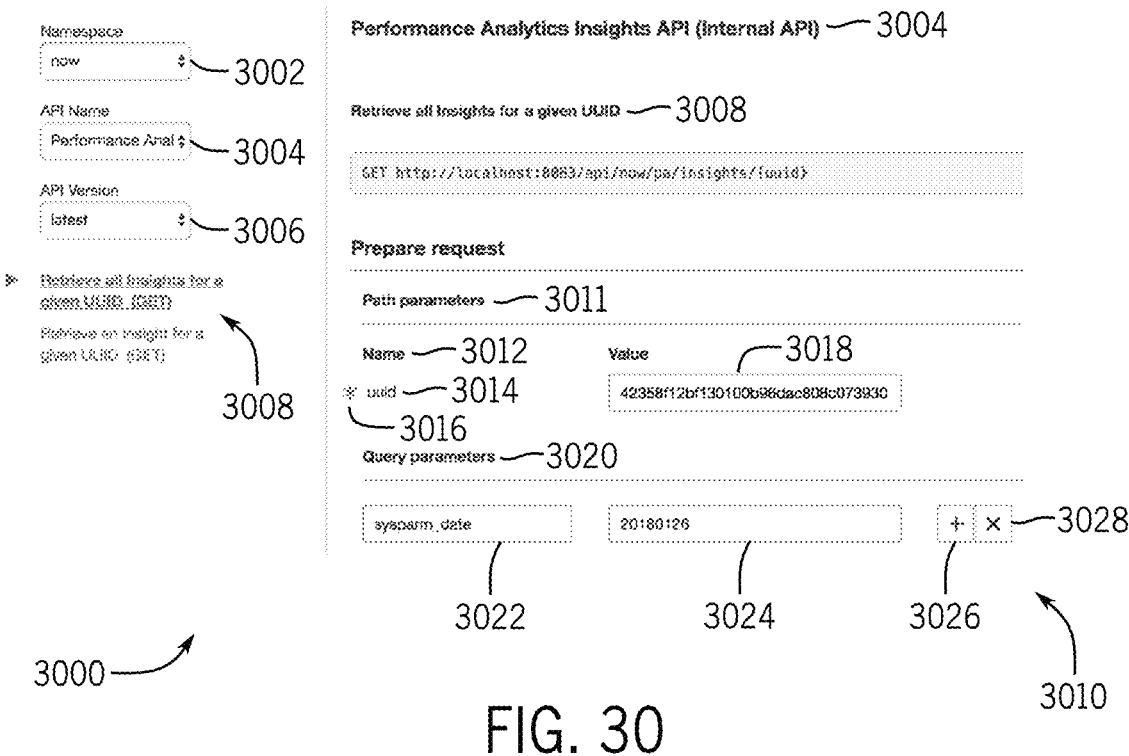
FIG. 30 is an illustration of a GUI for an application programming interface (API) explorer that may be used to view API calls that may be used in the request of FIG. 29, in accordance with an embodiment.

As previously noted, the news items/data insights for a specific date or date(s) may be pulled using an API, such as a performance analytics API. For example, all news items/data insights may be fetched for a specific UUID for an indicator and/or breakdown for the indicated dates or date. In some embodiments, the date may be omitted from the API request and a current date may be used for the fetch. The API may be viewed, edited, and/or called using an API explorer. FIG. 30 illustrates a GUI 3000 for an API explorer that may be used to view/edit/call the API in the request of FIG. 29. The GUI 3000 includes a namespace field 3002, an API name 3004, and an API version field 3006. The namespace field 3002 indicates what group of types, functions, and variables are accessed in the API explorer through the GUI 3000. The API name 3004 indicates an API being viewed, edited, and/or called in the GUI 3000. For example, the illustrated API name 3004 in the GUI 3000 indicates that a performance analytics insights API is being accessed. The API version field 3006 indicates a version for the API indicated in the API name 3004. For example, in the illustrated embodiment, a current version of the API is being viewed, edited, and/or called.

The GUI 3000 also includes a description 3008 of one or more functions of the API being viewed and/or edited. In some embodiments, more than one function may be listed and the function may be selected to view, edit, and/or call the corresponding function of the API. The GUI 3000 also includes a prepare request region 3010 that enables editing of a request to the API. The prepare region 3010 includes a path parameter 3011 that indicates a path for the indicator and/or breakdown for which news insights are to be pulled. The path parameter 3011 may include a label 3012 for the path. For example, the label 3012 indicates that the path parameters includes a UUID. In some embodiments, the path corresponding the label may be required for completing the API request. Accordingly, in some embodiments, the label 3014 may have a mark 3016 that indicates that a corresponding value 3018 for the label 3014 is required for the request. For example, in the illustrated embodiment, the GUI requires that a UUID is required before the request is generated.

The GUI 3000 also includes a query parameter 3020 that may indicate parameters of the query in the request. The query parameters 3020 may include a name field 3022 and a value field 3024. The name field 3022 indicates a name of the parameter. For instance, in the illustrated embodiment, the name field 3022 includes a "sysparm_date" that indicates that the query parameter 3020 includes a date used for the request. The value field 3024 may indicate a value for the parameter type indicated in the name field 3022. For example, in the illustrated embodiment, the value field 3024 indicates a date (Jan. 26, 2018) for the request used to determine news insights for the indicated date. In some embodiments, news items/data insights may be fetched from the news items database 2410 for dates as far back as stored in the news items database 2410.

The GUI 3000 may include an add parameter button 3026. Upon selection of the add parameter button 3026, the GUI 3000 may be used to add a new parameter for the query. In some embodiments, the search may be independent to include any results that satisfy any parameter or may be cumulative such that returned/fetched results satisfy all parameters. The GUI 3000 may include a remove parameter button 3028 that works to remove parameters like the add parameter button 3026 is used to add parameters to the query for the API request.

Figure 31:
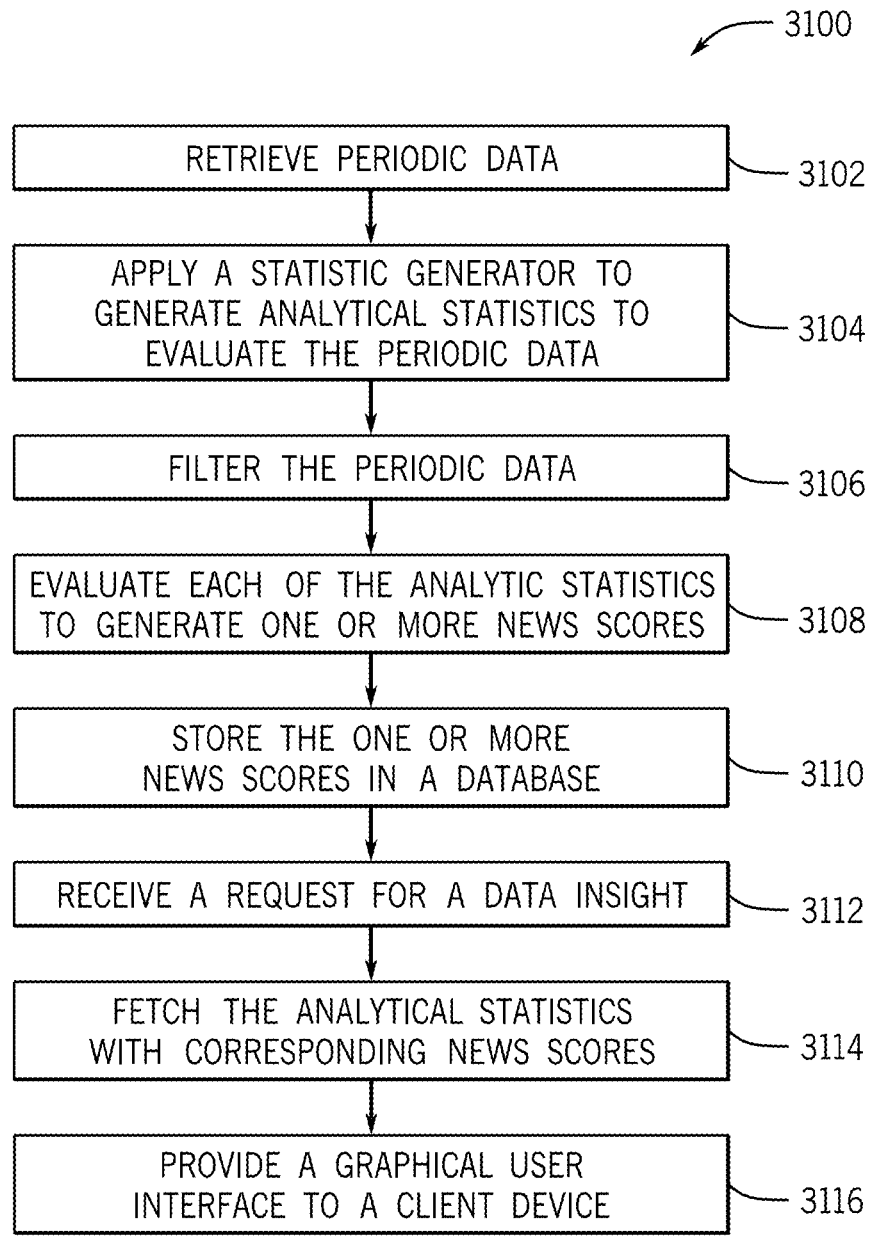
FIG. 31 is a flow diagram of a process that may be used to display news items, in accordance with an embodiment.

FIG. 31 illustrates a process 3100. The process 3100 may be at least partially executed by the platform 104. As previously noted, the platform 104 includes the database 108 and may host one or more instances. The database 108 may include one or more news scores each corresponding to one or more indicator types (e.g., number of open incidents). Each of the one or more news scores is based at least in part on a metric of the corresponding one or more indicator types. The platform 104 utilizes a news statistic collector to receive periodic data from a collector job that collects the periodic data (block 3102). The periodic data includes the metrics of the corresponding one or more indicator types for a period corresponding to the periodic data. The platform also uses the news stats collector to, for each indicator type, apply a statistic generator to generate analytical statistics to evaluate the periodic data (block 3104) and for each of the analytical statistics, filter the periodic data based at least in part on a news score threshold (block 3106). The platform 104 may also use a news evaluator to evaluate each of the analytical statistics to generate the one or more news scores (block 3108) and to store the one or more news scores to the database 108 (block 3110).

The platform 104 may also be used to generate insights using an insight generator. The insight generator of the platform 104 receives a request for a data insight for the one or more indicator types (block 3112). For example, the insight generator may receive a request from an application programming interface (API) requesting data insights for the data insights widget for the period. In response to the request, the insight generator fetches the analytical statistics from the database 108 with corresponding one or more news scores (block 3114). The insight generator then determines news items from the periodic data based at least in part on the one or more news scores in the fetched analytical statistics (block 3116). The insight generator also provides, to a client device (e.g., client 102) associated with the one or more instances (e.g., instance 130), a representation of a graphical user interface (GUI) that displays a data insights widget (block 3118). The data insights widget presents summaries of the news items based at least in part on corresponding news scores of the one or more news scores. Providing the GUI may include rendering at least a portion of the GUI on one or more servers of the platform 104 before transport to the client device and/or rendering at least a portion of the GUI on the client device based on data from the one or more servers of the platform 104.

In some embodiments, the news collector, the statistics generator, the news evaluator, and/or the insight generator may be application function blocks that include instructions stored in memory that may be called by processor(s) of one or more servers in the platform 104.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
a display device configured to present a graphical user interface, wherein the graphical user interface is configured to present filtered data summaries; and
a processor configured to track one or more indicator types of data to determine a subset of a dataset to emphasize relative to remaining data of the dataset by:
receiving the dataset comprising time-series data corresponding to the one or more indicator types of data;
filtering the dataset to remove a duplicated item from the dataset, wherein the duplicated item corresponds to a first score that is a duplicate of a second score, wherein the first score and the second score are derived from at least some of the time-series data, wherein the first score has a same indicator type as the second score, and wherein the first score is less than or equal to the second score;
determining that a condition is reached based at least in part on the one or more indicator types of data; and
responsive to determining that the condition is reached, outputting a representation of an updated filtered data summary to the graphical user interface, wherein the updated filtered data summary causes the graphical user interface to display data indicative of the condition being reached without displaying other data in the time-series data that has not reached a level indicative of other conditions and without displaying the duplicated item.

2. The system of claim 1, wherein determining that the condition is reached comprises determining that the one or more indicator types of data are predicted to reach the condition in the future.

3. The system of claim 1, wherein the condition comprises a threshold.

4. The system of claim 3, wherein the threshold comprises a global threshold for multiple users or a personal threshold for a particular user.

5. The system of claim 1, wherein the condition comprises a target value indicating a target level for the one or more indicator types of data.

6. The system of claim 1, wherein the condition comprises a news score threshold for the one or more indicator types of data.

7. The system of claim 1, wherein a first rule defines how a first determined statistic for at least some of the time-series data is to be converted to the first score, and wherein a second rule defines how a second determined statistic for at least some of the time-series data is to be converted to the second score.

8. The system of claim 1, wherein the processor is configured to determine that the condition is reached at least in part by determining that statistic values corresponding to the one or more indicator types of data are predicted to reach the condition.

9. The system of claim 1, wherein the processor is configured to normalize statistic values to generate the first score and the second score, and wherein the statistic values are normalized relative to other statistic values.

10. The system of claim 1, wherein the processor is configured to prioritize the condition over other conditions for other indicator types of data.

11. The system of claim 10, wherein prioritization of the condition is based at least in part on weighting of the condition or the other conditions in the graphical user interface.

12. A method comprising:
   receiving a dataset comprising time-series data corresponding to one or more indicator types of data;
   filtering the dataset to remove a duplicated item from the dataset, wherein the duplicated item corresponds to a first score that is a duplicate of a second score, wherein the first and the second score are derived from at least some of the time-series data, wherein the first score has a same indicator type as the second score, and wherein the first score is less than or equal to the second score;
   determining that a condition is reached based at least in part on the one or more indicator types of data; and
   responsive to determining that the condition is reached, generating a representation of an updated filtered data summary, wherein the representation, when displayed, graphically indicates the condition being reached, does not graphically indicate other data in the time-series data that has not reached a level indicative of other conditions, and does not graphically indicate the duplicated item.

13. The method of claim 12, wherein determining that the condition is reached comprises determining that the one or more indicator types of data are predicted to reach the condition in the future.

14. The method of claim 12, wherein the condition comprises a personal condition for a user or group of users.

15. The method of claim 12, wherein the condition comprises a global condition for users accessing a graphical user interface.

16. The method of claim 12, wherein the condition comprises a target or threshold level for each of the one or more indicator types of data.

17. The method of claim 16, wherein the condition comprises a less than threshold, a more than threshold, an all-time high, or an all-time low for the one or more indicator types of data.

18. A system comprising:
   a processor configured to track one or more indicator types of data to determine a subset of a dataset to emphasize relative to remaining data of the dataset by:
      filtering the dataset to remove a duplicated item from the dataset, wherein the duplicated item corresponds to a first score that is a duplicate of a second score, wherein the first score and the second score are derived from values of the dataset, wherein the first score has a same indicator type as the second score, and wherein the first score is less than or equal to the second score;
      determining that a condition is reached at least in part one the one or more indicator types of data; and
      responsive to determining that the condition is reached, outputting a representation of an updated filtered data summary to a graphical user interface, wherein the updated filtered data summary causes the graphical user interface to display data indicative of the condition being reached without displaying other data in the dataset that have not reached corresponding conditions and without displaying the duplicated item.

19. The system of claim 18, wherein determining the condition is reached comprises determining that the one or more indicator types of data are predicted to reach the condition in the future.

20. The system of claim 18, wherein the condition comprises a less than threshold, a more than threshold, an all-time high, or an all-time low for the one or more indicator types of data.

* * * * *